(12) United States Patent
Zhao et al.

(10) Patent No.: US 12,130,410 B2
(45) Date of Patent: Oct. 29, 2024

(54) IMAGING OPTICAL SYSTEM, IMAGING DEVICE, AND IMAGING SYSTEM

(71) Applicant: Panasonic Intellectual Property Management Co., Ltd., Osaka (JP)

(72) Inventors: Qinghua Zhao, Nara (JP); Yoshio Matsumura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 967 days.

(21) Appl. No.: 17/119,545

(22) Filed: Dec. 11, 2020

(65) Prior Publication Data

US 2021/0096335 A1 Apr. 1, 2021

Related U.S. Application Data

(63) Continuation of application No. PCT/JP2019/023535, filed on Jun. 13, 2019.

(30) Foreign Application Priority Data

Jul. 18, 2018 (JP) .................................. 2018-135301

(51) Int. Cl.
G02B 13/00 (2006.01)
G02B 9/64 (2006.01)
(Continued)

(52) U.S. Cl.
CPC ........... *G02B 13/0045* (2013.01); *G02B 9/64* (2013.01); *G02B 13/08* (2013.01); *G02B 27/0025* (2013.01)

(58) Field of Classification Search
CPC ...... G02B 13/0045; G02B 9/64; G02B 13/08; G02B 27/0025; G02B 13/06; G02B 13/10; G02B 13/12
(Continued)

(56) References Cited

U.S. PATENT DOCUMENTS 10,067,314 B2 9/2018 Imaoka
2004/0169726 A1 9/2004 Moustier et al.
(Continued)

FOREIGN PATENT DOCUMENTS

JP 2006-11093 1/2006
JP 2007-163549 6/2007
(Continued)

OTHER PUBLICATIONS

Office Action and Search Report issued Feb. 17, 2022 in Chinese Patent Application No. 201980035371.4, with English-language translation.
(Continued)

*Primary Examiner* — Henry Duong
(74) *Attorney, Agent, or Firm* — Wenderoth, Lind & Ponack, L.L.P.

(57) ABSTRACT

An imaging optical system has an image circle defined on an imaging element. The imaging optical system includes: lens elements arranged from an object side to an image plane side, and a diaphragm arranged between two of the lens elements. The lens elements include freeform lens elements, each having a freeform surface that is an asymmetrical surface with respect to a long side direction and a short side direction which cross with each other with a first diameter of the image circle in the long side direction being larger than a second diameter of the image circle in the short side direction. At least two of the freeform lens elements are located on an object side of the diaphragm. The imaging optical system satisfies a condition based on a summation for freeform surfaces of freeform lens elements located on the object side of the diaphragm.

13 Claims, 44 Drawing Sheets

(51) Int. Cl.
*G02B 13/08* (2006.01)
*G02B 27/00* (2006.01)

(58) Field of Classification Search
USPC .......................................................... 359/671
See application file for complete search history.

(56) References Cited

U.S. PATENT DOCUMENTS

| | | | | |
|---|---|---|---|---|
| 2007/0133107 | A1* | 6/2007 | Ohzawa | G02B 13/06 |
| | | | | 359/749 |
| 2010/0060992 | A1 | 3/2010 | Hirose | |
| 2010/0079874 | A1 | 4/2010 | Kamei | |
| 2010/0302647 | A1 | 12/2010 | Hirose | |

FOREIGN PATENT DOCUMENTS

| | | |
|---|---|---|
| JP | 2008-292800 | 12/2008 |
| JP | 2010-85849 | 4/2010 |
| JP | 2010-276755 | 12/2010 |
| JP | 2016-148725 | 8/2016 |
| WO | 03/010599 | 2/2003 |

OTHER PUBLICATIONS

Notice of Reasons for Refusal issued Oct. 4, 2022, in Japanese Patent Application No. 2020-530938, with English-language translation.

Notice of Reasons for Refusal issued Oct. 4, 2022, in Japanese Patent Application No. 2020-530939, with English-language translation.

Office Action issued Aug. 5, 2021 in European Patent Application No. 19837779.8.

International Search Report issued Jul. 23, 2019 in International (PCT) Application No. PCT/JP2019/023535.

International Preliminary Report on Patentability issued Jan. 28, 2021 in International (PCT) Patent Application No. PCT/JP2019/023535.

International Preliminary Report on Patentability issued Jan. 28, 2021 in International (PCT) Patent Application No. PCT/JP2019/023536.

Office Action issued Aug. 28, 2023 in U.S. Appl. No. 17/117,658.

* cited by examiner

FIG. 5

| NUMERICAL EXAMPLE 1 | | | | | |
|---|---|---|---|---|---|
| s | SURFACE TYPE | r | d | nd | vd |
| 1 | Spherical surface | 20.866 | 1.000 | 1.80998 | 40.9 |
| 2 | Aspherical surface | 7.102 | 3.666 | | |
| 3 | XY-polynomial surface | −6.445 | 1.000 | 1.53459 | 56.3 |
| 4 | XY-polynomial surface | 5.085 | 4.986 | | |
| 5 | XY-polynomial surface | −4.770 | 4.608 | 1.53459 | 56.3 |
| 6 | XY-polynomial surface | 5.691 | 0.170 | | |
| 7 | Spherical surface | 9.77164 | 2.593 | 1.64769 | 33.8 |
| 8 | Spherical surface | −75.786 | 0.261 | | |
| 9 | Spherical surface | 22.792 | 1.610 | 1.84666 | 23.8 |
| 10 | Spherical surface | −627.659 | 0.408 | | |
| 11 | Spherical surface | 23.146 | 1.249 | 1.49700 | 81.6 |
| 12 | Spherical surface | −276.578 | 1.348 | | |
| 13 | Spherical surface | −8.428 | 0.800 | 1.84666 | 23.8 |
| 14 | Spherical surface | −29.099 | 0.514 | | |
| 15 | Plane | Diaphragm | 0.150 | | |
| 16 | Spherical surface | 5.973 | 7.673 | 1.49700 | 81.6 |
| 17 | Spherical surface | −4.264 | 0.800 | 1.84666 | 23.8 |
| 18 | Spherical surface | −71.746 | 0.516 | | |
| 19 | Spherical surface | 8.074 | 2.590 | 1.59282 | 68.6 |
| 20 | Spherical surface | −197.292 | 0.165 | | |
| 21 | XY-polynomial surface | 4.595 | 2.497 | 1.63450 | 23.9 |
| 22 | XY-polynomial surface | −4.487 | 3.143 | | |

FIG. 6

| NUMERICAL EXAMPLE 1 | |
|---|---|
| F number | 2.00 |
| Vertical half angle of view | 35 |
| Horizontal half angle of view | 62.5 |
| Vertical image height | 1.83 |
| Horizontal image height | 2.90 |

FIG. 7

| | s2 (NUMERICAL EXAMPLE 1) |
|---|---|
| K | 0.00000E+00 |
| A4 | -1.26509E-04 |
| A6 | 8.62490E-06 |
| A8 | -1.75941E-07 |
| A10 | -4.09605E-09 |
| A12 | 0.00000E+00 |
| A14 | 0.00000E+00 |
| A16 | 0.00000E+00 |
| A18 | 0.00000E+00 |
| A20 | 0.00000E+00 |

FIG. 8

| s3 (NUMERICAL EXAMPLE 1) | | | | | |
|---|---|---|---|---|---|
| C1 | 0.00000E+00 | C23 | 0.00000E+00 | C45 | -3.06554E-06 |
| C2 | 0.00000E+00 | C24 | -4.21097E-05 | C46 | 0.00000E+00 |
| C3 | 0.00000E+00 | C25 | 0.00000E+00 | C47 | 0.00000E+00 |
| C4 | 1.10992E-01 | C26 | 1.83584E-04 | C48 | 0.00000E+00 |
| C5 | 0.00000E+00 | C27 | 0.00000E+00 | C49 | 0.00000E+00 |
| C6 | 1.41062E-01 | C28 | -6.16371E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 8.45466E-04 | C33 | 0.00000E+00 | C55 | 0.00000E+00 |
| C12 | 0.00000E+00 | C34 | 0.00000E+00 | C56 | 3.59414E-08 |
| C13 | 3.23902E-03 | C35 | 0.00000E+00 | C57 | 0.00000E+00 |
| C14 | 0.00000E+00 | C36 | 0.00000E+00 | C58 | 2.82938E-07 |
| C15 | 1.23516E-03 | C37 | -1.29583E-06 | C59 | 0.00000E+00 |
| C16 | 0.00000E+00 | C38 | 0.00000E+00 | C60 | 5.58793E-07 |
| C17 | 0.00000E+00 | C39 | -8.57029E-06 | C61 | 0.00000E+00 |
| C18 | 0.00000E+00 | C40 | 0.00000E+00 | C62 | 6.33327E-07 |
| C19 | 0.00000E+00 | C41 | -1.64344E-05 | C63 | 0.00000E+00 |
| C20 | 0.00000E+00 | C42 | 0.00000E+00 | C64 | 6.70034E-07 |
| C21 | 0.00000E+00 | C43 | -2.01717E-05 | C65 | 0.00000E+00 |
| C22 | -5.32794E-06 | C44 | 0.00000E+00 | C66 | -7.04485E-09 |

FIG. 9

| s4 | (NUMERICAL EXAMPLE 1) | | | | |
|---|---|---|---|---|---|
| C1 | 0.00000E+00 | C23 | 0.00000E+00 | C45 | -2.09709E-05 |
| C2 | 0.00000E+00 | C24 | 3.94612E-06 | C46 | 0.00000E+00 |
| C3 | 0.00000E+00 | C25 | 0.00000E+00 | C47 | 0.00000E+00 |
| C4 | 1.77470E-02 | C26 | 5.17605E-04 | C48 | 0.00000E+00 |
| C5 | 0.00000E+00 | C27 | 0.00000E+00 | C49 | 0.00000E+00 |
| C6 | 7.20576E-02 | C28 | -2.83574E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.23921E-03 | C33 | 0.00000E+00 | C55 | 0.00000E+00 |
| C12 | 0.00000E+00 | C34 | 0.00000E+00 | C56 | -6.92271E-07 |
| C13 | -2.60751E-04 | C35 | 0.00000E+00 | C57 | 0.00000E+00 |
| C14 | 0.00000E+00 | C36 | 0.00000E+00 | C58 | 1.22778E-07 |
| C15 | 1.50995E-03 | C37 | 1.49755E-05 | C59 | 0.00000E+00 |
| C16 | 0.00000E+00 | C38 | 0.00000E+00 | C60 | 4.94802E-06 |
| C17 | 0.00000E+00 | C39 | -2.02419E-05 | C61 | 0.00000E+00 |
| C18 | 0.00000E+00 | C40 | 0.00000E+00 | C62 | 3.45365E-06 |
| C19 | 0.00000E+00 | C41 | -7.07443E-05 | C63 | 0.00000E+00 |
| C20 | 0.00000E+00 | C42 | 0.00000E+00 | C64 | 4.91518E-06 |
| C21 | 0.00000E+00 | C43 | -9.43598E-05 | C65 | 0.00000E+00 |
| C22 | -1.67862E-04 | C44 | 0.00000E+00 | C66 | -2.75867E-07 |

FIG. 10

| s5 | (NUMERICAL EXAMPLE 1) | | | | |
|---|---|---|---|---|---|
| C1 | 0.00000E+00 | C23 | 0.00000E+00 | C45 | 9.23638E-06 |
| C2 | 0.00000E+00 | C24 | 2.78709E-04 | C46 | 0.00000E+00 |
| C3 | 0.00000E+00 | C25 | 0.00000E+00 | C47 | 0.00000E+00 |
| C4 | -3.65832E-02 | C26 | 1.97813E-04 | C48 | 0.00000E+00 |
| C5 | 0.00000E+00 | C27 | 0.00000E+00 | C49 | 0.00000E+00 |
| C6 | 2.50793E-02 | C28 | -7.38909E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 3.26486E-03 | C33 | 0.00000E+00 | C55 | 0.00000E+00 |
| C12 | 0.00000E+00 | C34 | 0.00000E+00 | C56 | -1.14225E-07 |
| C13 | 3.93911E-03 | C35 | 0.00000E+00 | C57 | 0.00000E+00 |
| C14 | 0.00000E+00 | C36 | 0.00000E+00 | C58 | 2.28563E-07 |
| C15 | 3.59304E-03 | C37 | 2.19850E-08 | C59 | 0.00000E+00 |
| C16 | 0.00000E+00 | C38 | 0.00000E+00 | C60 | 2.06500E-06 |
| C17 | 0.00000E+00 | C39 | -1.12735E-05 | C61 | 0.00000E+00 |
| C18 | 0.00000E+00 | C40 | 0.00000E+00 | C62 | -3.07499E-08 |
| C19 | 0.00000E+00 | C41 | -4.14844E-06 | C63 | 0.00000E+00 |
| C20 | 0.00000E+00 | C42 | 0.00000E+00 | C64 | 1.69753E-06 |
| C21 | 0.00000E+00 | C43 | -1.32569E-05 | C65 | 0.00000E+00 |
| C22 | 7.03743E-06 | C44 | 0.00000E+00 | C66 | -7.19700E-07 |

FIG. 11

| s6  | (NUMERICAL EXAMPLE 1) | | | | |
|-----|---------------|-----|---------------|-----|---------------|
| C1  | 0.00000E+00   | C23 | 0.00000E+00   | C45 | 3.42516E-07   |
| C2  | 0.00000E+00   | C24 | -1.96701E-05  | C46 | 0.00000E+00   |
| C3  | 0.00000E+00   | C25 | 0.00000E+00   | C47 | 0.00000E+00   |
| C4  | -1.29423E-01  | C26 | -4.11289E-05  | C48 | 0.00000E+00   |
| C5  | 0.00000E+00   | C27 | 0.00000E+00   | C49 | 0.00000E+00   |
| C6  | -1.10699E-01  | C28 | -1.52483E-05  | C50 | 0.00000E+00   |
| C7  | 0.00000E+00   | C29 | 0.00000E+00   | C51 | 0.00000E+00   |
| C8  | 0.00000E+00   | C30 | 0.00000E+00   | C52 | 0.00000E+00   |
| C9  | 0.00000E+00   | C31 | 0.00000E+00   | C53 | 0.00000E+00   |
| C10 | 0.00000E+00   | C32 | 0.00000E+00   | C54 | 0.00000E+00   |
| C11 | 1.68868E-04   | C33 | 0.00000E+00   | C55 | 0.00000E+00   |
| C12 | 0.00000E+00   | C34 | 0.00000E+00   | C56 | -7.42822E-09  |
| C13 | -5.75131E-05  | C35 | 0.00000E+00   | C57 | 0.00000E+00   |
| C14 | 0.00000E+00   | C36 | 0.00000E+00   | C58 | -1.00406E-07  |
| C15 | 7.12595E-05   | C37 | -4.08864E-07  | C59 | 0.00000E+00   |
| C16 | 0.00000E+00   | C38 | 0.00000E+00   | C60 | -2.41024E-07  |
| C17 | 0.00000E+00   | C39 | -9.49565E-07  | C61 | 0.00000E+00   |
| C18 | 0.00000E+00   | C40 | 0.00000E+00   | C62 | -3.57702E-07  |
| C19 | 0.00000E+00   | C41 | 1.37004E-06   | C63 | 0.00000E+00   |
| C20 | 0.00000E+00   | C42 | 0.00000E+00   | C64 | -1.51354E-08  |
| C21 | 0.00000E+00   | C43 | -6.80308E-07  | C65 | 0.00000E+00   |
| C22 | -1.20583E-05  | C44 | 0.00000E+00   | C66 | -5.16263E-08  |

FIG. 12

| s21 | (NUMERICAL EXAMPLE 1) | | | | |
|-----|------------|-----|-------------|-----|-------------|
| C1  | 0.00000E+00 | C23 | 0.00000E+00 | C45 | -1.69804E-05 |
| C2  | 0.00000E+00 | C24 | -6.89281E-04 | C46 | 0.00000E+00 |
| C3  | 0.00000E+00 | C25 | 0.00000E+00 | C47 | 0.00000E+00 |
| C4  | -6.59522E-03 | C26 | -1.57258E-04 | C48 | 0.00000E+00 |
| C5  | 0.00000E+00 | C27 | 0.00000E+00 | C49 | 0.00000E+00 |
| C6  | -4.18993E-02 | C28 | -6.60200E-05 | C50 | 0.00000E+00 |
| C7  | 0.00000E+00 | C29 | 0.00000E+00 | C51 | 0.00000E+00 |
| C8  | 0.00000E+00 | C30 | 0.00000E+00 | C52 | 0.00000E+00 |
| C9  | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.47685E-03 | C33 | 0.00000E+00 | C55 | 0.00000E+00 |
| C12 | 0.00000E+00 | C34 | 0.00000E+00 | C56 | -6.57481E-07 |
| C13 | -2.80571E-03 | C35 | 0.00000E+00 | C57 | 0.00000E+00 |
| C14 | 0.00000E+00 | C36 | 0.00000E+00 | C58 | -3.30337E-06 |
| C15 | -2.30366E-03 | C37 | 5.36306E-06 | C59 | 0.00000E+00 |
| C16 | 0.00000E+00 | C38 | 0.00000E+00 | C60 | -3.65937E-06 |
| C17 | 0.00000E+00 | C39 | 2.16418E-05 | C61 | 0.00000E+00 |
| C18 | 0.00000E+00 | C40 | 0.00000E+00 | C62 | -2.27994E-06 |
| C19 | 0.00000E+00 | C41 | -1.72187E-05 | C63 | 0.00000E+00 |
| C20 | 0.00000E+00 | C42 | 0.00000E+00 | C64 | 1.34436E-06 |
| C21 | 0.00000E+00 | C43 | -3.23460E-05 | C65 | 0.00000E+00 |
| C22 | -1.52283E-04 | C44 | 0.00000E+00 | C66 | 1.11688E-06 |

FIG. 13

| s22 | (NUMERICAL EXAMPLE 1) | | | | |
|---|---|---|---|---|---|
| C1 | 0.00000E+00 | C23 | 0.00000E+00 | C45 | -1.18753E-06 |
| C2 | 0.00000E+00 | C24 | -1.40487E-03 | C46 | 0.00000E+00 |
| C3 | 0.00000E+00 | C25 | 0.00000E+00 | C47 | 0.00000E+00 |
| C4 | 1.87000E-01 | C26 | -2.88597E-05 | C48 | 0.00000E+00 |
| C5 | 0.00000E+00 | C27 | 0.00000E+00 | C49 | 0.00000E+00 |
| C6 | 1.16999E-01 | C28 | -2.54143E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.51074E-03 | C33 | 0.00000E+00 | C55 | 0.00000E+00 |
| C12 | 0.00000E+00 | C34 | 0.00000E+00 | C56 | 1.00684E-06 |
| C13 | 9.85046E-03 | C35 | 0.00000E+00 | C57 | 0.00000E+00 |
| C14 | 0.00000E+00 | C36 | 0.00000E+00 | C58 | 3.49473E-06 |
| C15 | 3.09860E-03 | C37 | -1.91830E-05 | C59 | 0.00000E+00 |
| C16 | 0.00000E+00 | C38 | 0.00000E+00 | C60 | 5.23303E-06 |
| C17 | 0.00000E+00 | C39 | -6.85115E-06 | C61 | 0.00000E+00 |
| C18 | 0.00000E+00 | C40 | 0.00000E+00 | C62 | 2.52879E-06 |
| C19 | 0.00000E+00 | C41 | -1.70776E-05 | C63 | 0.00000E+00 |
| C20 | 0.00000E+00 | C42 | 0.00000E+00 | C64 | 2.71253E-06 |
| C21 | 0.00000E+00 | C43 | -2.37488E-05 | C65 | 0.00000E+00 |
| C22 | -1.13853E-04 | C44 | 0.00000E+00 | C66 | 2.02326E-06 |

FIG. 15

|  | NUMERICAL EXAMPLE 1 | NUMERICAL EXAMPLE 2 | NUMERICAL EXAMPLE 3 |
|---|---|---|---|
| CONDITION (1) | 0.0085 | 0.0075 | 0.0104 |
| CONDITION (2) | 0.0085 | 0.0084 | 0.0104 |
| CONDITION (3) | 0.0093 | 0.0087 | 0.0113 |
| CONDITION (4) | −0.56 | −0.27 | −2.82 |
| CONDITION (5) | −1.63 | −0.10 | 4.99 |
| CONDITION (6) | 1.00 | 1.00 | 0.93 |
| CONDITION (7) | 1.53 | 1.53 | 1.64 |

FIG. 18

| NUMERICAL EXAMPLE 2 | | | | | |
|---|---|---|---|---|---|
| s | SURFACE TYPE | r | d | nd | vd |
| 1 | Spherical surface | 24.008 | 1.000 | 1.77250 | 49.6 |
| 2 | Aspherical surface | 8.222 | 3.004 | | |
| 3 | XY-polynomial surface | 99.502 | 1.121 | 1.53459 | 56.3 |
| 4 | XY-polynomial surface | 8.551 | 5.860 | | |
| 5 | XY-polynomial surface | -4.712 | 2.026 | 1.53459 | 56.3 |
| 6 | XY-polynomial surface | -7.765 | 0.615 | | |
| 7 | Spherical surface | -102.502 | 1.579 | 1.84666 | 23.8 |
| 8 | Spherical surface | -14.395 | 4.332 | | |
| 9 | Aspherical surface | 7.075 | 2.495 | 1.49700 | 81.6 |
| 10 | Aspherical surface | -10.121 | 0.516 | | |
| 11 | Spherical surface | -19.466 | 0.500 | 1.84666 | 23.8 |
| 12 | Spherical surface | -355.960 | 0.751 | | |
| 13 | Plane | Diaphragm | 1.825 | | |
| 14 | Spherical surface | 6.996 | 1.845 | 1.61800 | 63.4 |
| 15 | Spherical surface | -6.020 | 0.500 | 1.84666 | 23.8 |
| 16 | Spherical surface | 7.005 | 0.543 | | |
| 17 | Spherical surface | 6.470 | 1.034 | 1.84666 | 23.8 |
| 18 | Spherical surface | 9.125 | 0.964 | | |
| 19 | XY-polynomial surface | 8.064 | 1.651 | 1.63450 | 23.9 |
| 20 | XY-polynomial surface | 26.253 | 3.049 | | |

FIG. 19

| NUMERICAL EXAMPLE 2 | |
|---|---:|
| F number | 2.00 |
| Vertical half angle of view | 35 |
| Horizontal half angle of view | 62.5 |
| Vertical image height | 1.95 |
| Horizontal image height | 3.10 |

FIG. 20

| | s2 (NUMERICAL EXAMPLE 2) |
|---|---|
| K | 0.00000E+00 |
| A4 | -2.28171E-04 |
| A6 | -3.48673E-06 |
| A8 | 4.35275E-08 |
| A10 | -5.89670E-10 |
| A12 | 0.00000E+00 |
| A14 | 0.00000E+00 |
| A16 | 0.00000E+00 |
| A18 | 0.00000E+00 |
| A20 | 0.00000E+00 |

FIG. 21

| s3 (NUMERICAL EXAMPLE 2) | | | | | |
|---|---|---|---|---|---|
| C1 | 0.00000E+00 | C23 | 0.00000E+00 | C45 | 1.20794E-06 |
| C2 | 0.00000E+00 | C24 | -9.76456E-05 | C46 | 0.00000E+00 |
| C3 | 0.00000E+00 | C25 | 0.00000E+00 | C47 | 0.00000E+00 |
| C4 | -6.06983E-03 | C26 | 8.80722E-05 | C48 | 0.00000E+00 |
| C5 | 0.00000E+00 | C27 | 0.00000E+00 | C49 | 0.00000E+00 |
| C6 | -2.43295E-03 | C28 | 6.30100E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 3.60774E-04 | C33 | 0.00000E+00 | C55 | 0.00000E+00 |
| C12 | 0.00000E+00 | C34 | 0.00000E+00 | C56 | 1.14053E-09 |
| C13 | 4.38640E-03 | C35 | 0.00000E+00 | C57 | 0.00000E+00 |
| C14 | 0.00000E+00 | C36 | 0.00000E+00 | C58 | 1.27318E-08 |
| C15 | -6.77123E-04 | C37 | -1.26821E-07 | C59 | 0.00000E+00 |
| C16 | 0.00000E+00 | C38 | 0.00000E+00 | C60 | 4.53019E-08 |
| C17 | 0.00000E+00 | C39 | 2.86033E-07 | C61 | 0.00000E+00 |
| C18 | 0.00000E+00 | C40 | 0.00000E+00 | C62 | 5.73760E-08 |
| C19 | 0.00000E+00 | C41 | -2.82489E-06 | C63 | 0.00000E+00 |
| C20 | 0.00000E+00 | C42 | 0.00000E+00 | C64 | 3.98401E-08 |
| C21 | 0.00000E+00 | C43 | -2.70930E-06 | C65 | 0.00000E+00 |
| C22 | 2.63936E-06 | C44 | 0.00000E+00 | C66 | -3.81998E-08 |

FIG. 22

| s4 | (NUMERICAL EXAMPLE 2) | | | | |
|---|---|---|---|---|---|
| C1 | 0.00000E+00 | C23 | 0.00000E+00 | C45 | 3.91443E-06 |
| C2 | 0.00000E+00 | C24 | 4.42914E-04 | C46 | 0.00000E+00 |
| C3 | 0.00000E+00 | C25 | 0.00000E+00 | C47 | 0.00000E+00 |
| C4 | 6.18047E-02 | C26 | 7.03468E-04 | C48 | 0.00000E+00 |
| C5 | 0.00000E+00 | C27 | 0.00000E+00 | C49 | 0.00000E+00 |
| C6 | 7.42200E-02 | C28 | 5.82876E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.24051E-03 | C33 | 0.00000E+00 | C55 | 0.00000E+00 |
| C12 | 0.00000E+00 | C34 | 0.00000E+00 | C56 | 3.31456E-07 |
| C13 | 3.65539E-03 | C35 | 0.00000E+00 | C57 | 0.00000E+00 |
| C14 | 0.00000E+00 | C36 | 0.00000E+00 | C58 | 5.03696E-07 |
| C15 | -1.37999E-03 | C37 | -5.81977E-07 | C59 | 0.00000E+00 |
| C16 | 0.00000E+00 | C38 | 0.00000E+00 | C60 | 3.98397E-06 |
| C17 | 0.00000E+00 | C39 | 7.41100E-06 | C61 | 0.00000E+00 |
| C18 | 0.00000E+00 | C40 | 0.00000E+00 | C62 | 4.23733E-06 |
| C19 | 0.00000E+00 | C41 | -2.01667E-05 | C63 | 0.00000E+00 |
| C20 | 0.00000E+00 | C42 | 0.00000E+00 | C64 | 3.09819E-06 |
| C21 | 0.00000E+00 | C43 | -1.41543E-05 | C65 | 0.00000E+00 |
| C22 | 7.58465E-05 | C44 | 0.00000E+00 | C66 | -2.25667E-07 |

FIG. 23

| s5 | (NUMERICAL EXAMPLE 2) | | | | |
|---|---|---|---|---|---|
| C1 | 0.00000E+00 | C23 | 0.00000E+00 | C45 | -9.80847E-07 |
| C2 | 0.00000E+00 | C24 | 7.07003E-04 | C46 | 0.00000E+00 |
| C3 | 0.00000E+00 | C25 | 0.00000E+00 | C47 | 0.00000E+00 |
| C4 | -1.07875E-02 | C26 | 5.33233E-04 | C48 | 0.00000E+00 |
| C5 | 0.00000E+00 | C27 | 0.00000E+00 | C49 | 0.00000E+00 |
| C6 | 4.04752E-02 | C28 | 4.97367E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -2.50919E-04 | C33 | 0.00000E+00 | C55 | 0.00000E+00 |
| C12 | 0.00000E+00 | C34 | 0.00000E+00 | C56 | -3.60950E-08 |
| C13 | -3.94829E-03 | C35 | 0.00000E+00 | C57 | 0.00000E+00 |
| C14 | 0.00000E+00 | C36 | 0.00000E+00 | C58 | -3.41594E-07 |
| C15 | -1.30943E-03 | C37 | 2.21710E-06 | C59 | 0.00000E+00 |
| C16 | 0.00000E+00 | C38 | 0.00000E+00 | C60 | 1.47719E-06 |
| C17 | 0.00000E+00 | C39 | -1.96053E-05 | C61 | 0.00000E+00 |
| C18 | 0.00000E+00 | C40 | 0.00000E+00 | C62 | -1.84970E-06 |
| C19 | 0.00000E+00 | C41 | -3.11695E-05 | C63 | 0.00000E+00 |
| C20 | 0.00000E+00 | C42 | 0.00000E+00 | C64 | 2.52793E-07 |
| C21 | 0.00000E+00 | C43 | 9.38514E-06 | C65 | 0.00000E+00 |
| C22 | 3.47134E-05 | C44 | 0.00000E+00 | C66 | -7.38039E-09 |

FIG. 24

| s6 | (NUMERICAL EXAMPLE 2) | | | | |
|---|---|---|---|---|---|
| C1 | 0.00000E+00 | C23 | 0.00000E+00 | C45 | -5.53009E-07 |
| C2 | 0.00000E+00 | C24 | 2.79172E-04 | C46 | 0.00000E+00 |
| C3 | 0.00000E+00 | C25 | 0.00000E+00 | C47 | 0.00000E+00 |
| C4 | -1.59991E-02 | C26 | 2.29148E-04 | C48 | 0.00000E+00 |
| C5 | 0.00000E+00 | C27 | 0.00000E+00 | C49 | 0.00000E+00 |
| C6 | 1.19941E-02 | C28 | 3.11126E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.30542E-04 | C33 | 0.00000E+00 | C55 | 0.00000E+00 |
| C12 | 0.00000E+00 | C34 | 0.00000E+00 | C56 | 5.05048E-09 |
| C13 | -1.80893E-03 | C35 | 0.00000E+00 | C57 | 0.00000E+00 |
| C14 | 0.00000E+00 | C36 | 0.00000E+00 | C58 | 1.09745E-07 |
| C15 | -7.98607E-04 | C37 | -1.27215E-07 | C59 | 0.00000E+00 |
| C16 | 0.00000E+00 | C38 | 0.00000E+00 | C60 | 5.05171E-07 |
| C17 | 0.00000E+00 | C39 | -1.12679E-05 | C61 | 0.00000E+00 |
| C18 | 0.00000E+00 | C40 | 0.00000E+00 | C62 | -1.46572E-07 |
| C19 | 0.00000E+00 | C41 | -1.77312E-05 | C63 | 0.00000E+00 |
| C20 | 0.00000E+00 | C42 | 0.00000E+00 | C64 | -3.98841E-08 |
| C21 | 0.00000E+00 | C43 | -1.86640E-06 | C65 | 0.00000E+00 |
| C22 | 2.29093E-05 | C44 | 0.00000E+00 | C66 | 7.24491E-09 |

FIG. 25

| | s9 (NUMERICAL EXAMPLE 2) |
|---|---|
| K | 0.00000E+00 |
| A4 | 2.01912E-05 |
| A6 | 8.91157E-06 |
| A8 | 0.00000E+00 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

*FIG. 26*

| | s10 (NUMERICAL EXAMPLE 2) |
|---|---|
| K | 0.00000E+00 |
| A4 | 3.82731E-04 |
| A6 | 1.62196E-05 |
| A8 | -5.10659E-07 |
| A10 | 2.36125E-09 |
| A12 | 0.00000E+00 |
| A14 | 0.00000E+00 |
| A16 | 0.00000E+00 |
| A18 | 0.00000E+00 |
| A20 | 0.00000E+00 |

FIG. 27

| s19 | (NUMERICAL EXAMPLE 2) | | | | |
|---|---|---|---|---|---|
| C1 | 0.00000E+00 | C23 | 0.00000E+00 | C45 | 2.48620E-06 |
| C2 | 0.00000E+00 | C24 | -2.10518E-03 | C46 | 0.00000E+00 |
| C3 | 0.00000E+00 | C25 | 0.00000E+00 | C47 | 0.00000E+00 |
| C4 | 2.26028E-02 | C26 | -9.37829E-04 | C48 | 0.00000E+00 |
| C5 | 0.00000E+00 | C27 | 0.00000E+00 | C49 | 0.00000E+00 |
| C6 | -4.51438E-02 | C28 | -2.74155E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.44930E-03 | C33 | 0.00000E+00 | C55 | 0.00000E+00 |
| C12 | 0.00000E+00 | C34 | 0.00000E+00 | C56 | -1.08175E-06 |
| C13 | 3.88484E-04 | C35 | 0.00000E+00 | C57 | 0.00000E+00 |
| C14 | 0.00000E+00 | C36 | 0.00000E+00 | C58 | -1.60127E-05 |
| C15 | -4.19739E-03 | C37 | 2.35638E-06 | C59 | 0.00000E+00 |
| C16 | 0.00000E+00 | C38 | 0.00000E+00 | C60 | -1.75830E-05 |
| C17 | 0.00000E+00 | C39 | 1.85027E-04 | C61 | 0.00000E+00 |
| C18 | 0.00000E+00 | C40 | 0.00000E+00 | C62 | -2.68280E-05 |
| C19 | 0.00000E+00 | C41 | 3.76756E-05 | C63 | 0.00000E+00 |
| C20 | 0.00000E+00 | C42 | 0.00000E+00 | C64 | -1.86740E-06 |
| C21 | 0.00000E+00 | C43 | 2.50138E-06 | C65 | 0.00000E+00 |
| C22 | -8.43078E-05 | C44 | 0.00000E+00 | C66 | 4.70568E-07 |

FIG. 28

| s20 | (NUMERICAL EXAMPLE 2) | | | | |
|---|---|---|---|---|---|
| C1 | 0.00000E+00 | C23 | 0.00000E+00 | C45 | 3.60902E-05 |
| C2 | 0.00000E+00 | C24 | -2.38885E-03 | C46 | 0.00000E+00 |
| C3 | 0.00000E+00 | C25 | 0.00000E+00 | C47 | 0.00000E+00 |
| C4 | 1.59203E-02 | C26 | -1.10737E-03 | C48 | 0.00000E+00 |
| C5 | 0.00000E+00 | C27 | 0.00000E+00 | C49 | 0.00000E+00 |
| C6 | -7.51307E-02 | C28 | -3.42652E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.97555E-03 | C33 | 0.00000E+00 | C55 | 0.00000E+00 |
| C12 | 0.00000E+00 | C34 | 0.00000E+00 | C56 | 5.97881E-07 |
| C13 | 7.92364E-03 | C35 | 0.00000E+00 | C57 | 0.00000E+00 |
| C14 | 0.00000E+00 | C36 | 0.00000E+00 | C58 | -4.81693E-06 |
| C15 | -9.43116E-04 | C37 | -2.44141E-05 | C59 | 0.00000E+00 |
| C16 | 0.00000E+00 | C38 | 0.00000E+00 | C60 | 7.84075E-07 |
| C17 | 0.00000E+00 | C39 | 1.08347E-04 | C61 | 0.00000E+00 |
| C18 | 0.00000E+00 | C40 | 0.00000E+00 | C62 | -8.60032E-06 |
| C19 | 0.00000E+00 | C41 | 2.23637E-05 | C63 | 0.00000E+00 |
| C20 | 0.00000E+00 | C42 | 0.00000E+00 | C64 | -1.83483E-06 |
| C21 | 0.00000E+00 | C43 | 5.13076E-05 | C65 | 0.00000E+00 |
| C22 | 5.89711E-05 | C44 | 0.00000E+00 | C66 | -1.61350E-06 |

FIG. 32

| | NUMERICAL EXAMPLE 3 | | | | |
|---|---|---|---|---|---|
| s | SURFACE TYPE | r | d | nd | vd |
| 1 | Spherical surface | 20.763 | 1.000 | 1.80998 | 40.9 |
| 2 | Aspherical surface | 7.147 | 3.546 | | |
| 3 | XY-polynomial surface | -6.502 | 1.000 | 1.53459 | 56.3 |
| 4 | XY-polynomial surface | 4.980 | 5.023 | | |
| 5 | XY-polynomial surface | -4.858 | 4.705 | 1.53459 | 56.3 |
| 6 | XY-polynomial surface | 7.600 | 0.342 | | |
| 7 | XY-polynomial surface | 9.484093 | 1.252 | 1.63450 | 23.9 |
| 8 | XY-polynomial surface | 16.736 | 0.421 | | |
| 9 | Spherical surface | 13.268 | 1.416 | 1.84666 | 23.8 |
| 10 | Spherical surface | 40.352 | 0.425 | | |
| 11 | Spherical surface | 14.434 | 1.424 | 1.49700 | 81.6 |
| 12 | Spherical surface | 395.590 | 1.391 | | |
| 13 | Spherical surface | -7.736 | 0.800 | 1.84666 | 23.8 |
| 14 | Spherical surface | -22.591 | 0.489 | | |
| 15 | Plane | Diaphragm | 0.150 | | |
| 16 | Spherical surface | 6.069 | 7.734 | 1.49700 | 81.6 |
| 17 | Spherical surface | -4.287 | 0.800 | 1.84666 | 23.8 |
| 18 | Spherical surface | -40.347 | 0.478 | | |
| 19 | Spherical surface | 8.233 | 2.653 | 1.59282 | 68.6 |
| 20 | Spherical surface | -99.491 | 0.150 | | |
| 21 | XY-polynomial surface | 4.863 | 2.542 | 1.63450 | 23.9 |
| 22 | XY-polynomial surface | -4.498 | 3.207 | | |

FIG. 33

| NUMERICAL EXAMPLE 3 | |
|---|---|
| F number | 1.96 |
| Vertical half angle of view | 35 |
| Horizontal half angle of view | 62.5 |
| Vertical image height | 1.83 |
| Horizontal image height | 2.90 |

*FIG. 34*

| | s2 (NUMERICAL EXAMPLE 3) |
|---|---|
| K | 0.00000E+00 |
| A4 | -1.24234E-04 |
| A6 | 8.29609E-06 |
| A8 | -1.63247E-07 |
| A10 | -4.41777E-09 |
| A12 | 0.00000E+00 |
| A14 | 0.00000E+00 |
| A16 | 0.00000E+00 |
| A18 | 0.00000E+00 |
| A20 | 0.00000E+00 |

FIG. 35

| s3 (NUMERICAL EXAMPLE 3) | | | | | |
|---|---|---|---|---|---|
| C1 | 0.00000E+00 | C23 | 0.00000E+00 | C45 | -2.57893E-06 |
| C2 | 0.00000E+00 | C24 | -2.15251E-05 | C46 | 0.00000E+00 |
| C3 | 0.00000E+00 | C25 | 0.00000E+00 | C47 | 0.00000E+00 |
| C4 | 1.10942E-01 | C26 | 1.48987E-04 | C48 | 0.00000E+00 |
| C5 | 0.00000E+00 | C27 | 0.00000E+00 | C49 | 0.00000E+00 |
| C6 | 1.38220E-01 | C28 | -5.02708E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 9.23410E-04 | C33 | 0.00000E+00 | C55 | 0.00000E+00 |
| C12 | 0.00000E+00 | C34 | 0.00000E+00 | C56 | 3.52984E-08 |
| C13 | 2.81235E-03 | C35 | 0.00000E+00 | C57 | 0.00000E+00 |
| C14 | 0.00000E+00 | C36 | 0.00000E+00 | C58 | 2.87255E-07 |
| C15 | 1.03733E-03 | C37 | -1.32800E-06 | C59 | 0.00000E+00 |
| C16 | 0.00000E+00 | C38 | 0.00000E+00 | C60 | 4.76472E-07 |
| C17 | 0.00000E+00 | C39 | -9.22628E-06 | C61 | 0.00000E+00 |
| C18 | 0.00000E+00 | C40 | 0.00000E+00 | C62 | 6.93729E-07 |
| C19 | 0.00000E+00 | C41 | -1.40365E-05 | C63 | 0.00000E+00 |
| C20 | 0.00000E+00 | C42 | 0.00000E+00 | C64 | 3.03625E-07 |
| C21 | 0.00000E+00 | C43 | -1.80926E-05 | C65 | 0.00000E+00 |
| C22 | -5.82762E-06 | C44 | 0.00000E+00 | C66 | 1.80510E-07 |

FIG. 36

| s4 | (NUMERICAL EXAMPLE 3) | | | | |
|---|---|---|---|---|---|
| C1 | 0.00000E+00 | C23 | 0.00000E+00 | C45 | -1.09393E-05 |
| C2 | 0.00000E+00 | C24 | 5.43975E-05 | C46 | 0.00000E+00 |
| C3 | 0.00000E+00 | C25 | 0.00000E+00 | C47 | 0.00000E+00 |
| C4 | 1.80590E-02 | C26 | 3.73361E-04 | C48 | 0.00000E+00 |
| C5 | 0.00000E+00 | C27 | 0.00000E+00 | C49 | 0.00000E+00 |
| C6 | 7.32486E-02 | C28 | -5.18225E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.41802E-03 | C33 | 0.00000E+00 | C55 | 0.00000E+00 |
| C12 | 0.00000E+00 | C34 | 0.00000E+00 | C56 | -7.34114E-07 |
| C13 | -9.92151E-04 | C35 | 0.00000E+00 | C57 | 0.00000E+00 |
| C14 | 0.00000E+00 | C36 | 0.00000E+00 | C58 | 9.40033E-09 |
| C15 | 1.42900E-03 | C37 | 1.57036E-05 | C59 | 0.00000E+00 |
| C16 | 0.00000E+00 | C38 | 0.00000E+00 | C60 | 4.88485E-06 |
| C17 | 0.00000E+00 | C39 | -2.34907E-05 | C61 | 0.00000E+00 |
| C18 | 0.00000E+00 | C40 | 0.00000E+00 | C62 | 4.97103E-06 |
| C19 | 0.00000E+00 | C41 | -7.68814E-05 | C63 | 0.00000E+00 |
| C20 | 0.00000E+00 | C42 | 0.00000E+00 | C64 | 1.64713E-06 |
| C21 | 0.00000E+00 | C43 | -8.38376E-05 | C65 | 0.00000E+00 |
| C22 | -1.64786E-04 | C44 | 0.00000E+00 | C66 | 1.84240E-06 |

FIG. 37

| s5 | (NUMERICAL EXAMPLE 3) | | | | |
|---|---|---|---|---|---|
| C1 | 0.00000E+00 | C23 | 0.00000E+00 | C45 | 7.90836E-06 |
| C2 | 0.00000E+00 | C24 | 3.27876E-04 | C46 | 0.00000E+00 |
| C3 | 0.00000E+00 | C25 | 0.00000E+00 | C47 | 0.00000E+00 |
| C4 | -3.75432E-02 | C26 | 7.68804E-05 | C48 | 0.00000E+00 |
| C5 | 0.00000E+00 | C27 | 0.00000E+00 | C49 | 0.00000E+00 |
| C6 | 3.65918E-02 | C28 | 5.91378E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.46340E-03 | C33 | 0.00000E+00 | C55 | 0.00000E+00 |
| C12 | 0.00000E+00 | C34 | 0.00000E+00 | C56 | 3.23938E-08 |
| C13 | 1.55227E-03 | C35 | 0.00000E+00 | C57 | 0.00000E+00 |
| C14 | 0.00000E+00 | C36 | 0.00000E+00 | C58 | 3.32748E-08 |
| C15 | 4.00388E-03 | C37 | -2.45166E-06 | C59 | 0.00000E+00 |
| C16 | 0.00000E+00 | C38 | 0.00000E+00 | C60 | 1.13133E-06 |
| C17 | 0.00000E+00 | C39 | -1.48218E-05 | C61 | 0.00000E+00 |
| C18 | 0.00000E+00 | C40 | 0.00000E+00 | C62 | -3.92548E-07 |
| C19 | 0.00000E+00 | C41 | 8.62481E-06 | C63 | 0.00000E+00 |
| C20 | 0.00000E+00 | C42 | 0.00000E+00 | C64 | 3.95303E-07 |
| C21 | 0.00000E+00 | C43 | 1.36979E-06 | C65 | 0.00000E+00 |
| C22 | 2.00439E-05 | C44 | 0.00000E+00 | C66 | -3.58497E-07 |

FIG. 38

| s6 | (NUMERICAL EXAMPLE 3) | | | | |
|---|---|---|---|---|---|
| C1 | 0.00000E+00 | C23 | 0.00000E+00 | C45 | 2.13388E-06 |
| C2 | 0.00000E+00 | C24 | 6.47386E-05 | C46 | 0.00000E+00 |
| C3 | 0.00000E+00 | C25 | 0.00000E+00 | C47 | 0.00000E+00 |
| C4 | -1.36051E-01 | C26 | 5.84728E-06 | C48 | 0.00000E+00 |
| C5 | 0.00000E+00 | C27 | 0.00000E+00 | C49 | 0.00000E+00 |
| C6 | -1.02082E-01 | C28 | 8.23403E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 3.08277E-04 | C33 | 0.00000E+00 | C55 | 0.00000E+00 |
| C12 | 0.00000E+00 | C34 | 0.00000E+00 | C56 | -1.73591E-09 |
| C13 | -1.18542E-03 | C35 | 0.00000E+00 | C57 | 0.00000E+00 |
| C14 | 0.00000E+00 | C36 | 0.00000E+00 | C58 | 8.29359E-08 |
| C15 | 6.75062E-04 | C37 | 4.19546E-07 | C59 | 0.00000E+00 |
| C16 | 0.00000E+00 | C38 | 0.00000E+00 | C60 | -1.47670E-07 |
| C17 | 0.00000E+00 | C39 | -3.58038E-06 | C61 | 0.00000E+00 |
| C18 | 0.00000E+00 | C40 | 0.00000E+00 | C62 | -1.30513E-07 |
| C19 | 0.00000E+00 | C41 | -1.44514E-06 | C63 | 0.00000E+00 |
| C20 | 0.00000E+00 | C42 | 0.00000E+00 | C64 | -7.19297E-07 |
| C21 | 0.00000E+00 | C43 | 6.05965E-06 | C65 | 0.00000E+00 |
| C22 | -2.13021E-05 | C44 | 0.00000E+00 | C66 | -1.13953E-07 |

FIG. 39

| s7 | (NUMERICAL EXAMPLE 3) | | | | |
|---|---|---|---|---|---|
| C1 | 0.00000E+00 | C23 | 0.00000E+00 | C45 | -2.49294E-07 |
| C2 | 0.00000E+00 | C24 | -1.44330E-05 | C46 | 0.00000E+00 |
| C3 | 0.00000E+00 | C25 | 0.00000E+00 | C47 | 0.00000E+00 |
| C4 | -5.35177E-04 | C26 | 5.53192E-05 | C48 | 0.00000E+00 |
| C5 | 0.00000E+00 | C27 | 0.00000E+00 | C49 | 0.00000E+00 |
| C6 | 3.38681E-03 | C28 | 5.00597E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.11617E-04 | C33 | 0.00000E+00 | C55 | 0.00000E+00 |
| C12 | 0.00000E+00 | C34 | 0.00000E+00 | C56 | -1.81966E-08 |
| C13 | 7.65026E-04 | C35 | 0.00000E+00 | C57 | 0.00000E+00 |
| C14 | 0.00000E+00 | C36 | 0.00000E+00 | C58 | 3.16168E-07 |
| C15 | -9.84965E-05 | C37 | 7.74413E-07 | C59 | 0.00000E+00 |
| C16 | 0.00000E+00 | C38 | 0.00000E+00 | C60 | 4.10750E-08 |
| C17 | 0.00000E+00 | C39 | 1.36444E-06 | C61 | 0.00000E+00 |
| C18 | 0.00000E+00 | C40 | 0.00000E+00 | C62 | 3.65883E-07 |
| C19 | 0.00000E+00 | C41 | -3.30070E-06 | C63 | 0.00000E+00 |
| C20 | 0.00000E+00 | C42 | 0.00000E+00 | C64 | -5.52947E-07 |
| C21 | 0.00000E+00 | C43 | 8.35627E-06 | C65 | 0.00000E+00 |
| C22 | -3.16935E-06 | C44 | 0.00000E+00 | C66 | -1.33204E-07 |

FIG. 40

| s8 | (NUMERICAL EXAMPLE 3) | | | | |
|---|---|---|---|---|---|
| C1 | 0.00000E+00 | C23 | 0.00000E+00 | C45 | -1.28618E-06 |
| C2 | 0.00000E+00 | C24 | -9.03631E-05 | C46 | 0.00000E+00 |
| C3 | 0.00000E+00 | C25 | 0.00000E+00 | C47 | 0.00000E+00 |
| C4 | 2.36859E-03 | C26 | 1.50373E-05 | C48 | 0.00000E+00 |
| C5 | 0.00000E+00 | C27 | 0.00000E+00 | C49 | 0.00000E+00 |
| C6 | -2.00986E-03 | C28 | 2.96287E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.20768E-04 | C33 | 0.00000E+00 | C55 | 0.00000E+00 |
| C12 | 0.00000E+00 | C34 | 0.00000E+00 | C56 | -4.56930E-09 |
| C13 | 1.43245E-03 | C35 | 0.00000E+00 | C57 | 0.00000E+00 |
| C14 | 0.00000E+00 | C36 | 0.00000E+00 | C58 | 2.60023E-07 |
| C15 | -3.29940E-04 | C37 | -2.94998E-07 | C59 | 0.00000E+00 |
| C16 | 0.00000E+00 | C38 | 0.00000E+00 | C60 | -1.32841E-07 |
| C17 | 0.00000E+00 | C39 | 6.20651E-06 | C61 | 0.00000E+00 |
| C18 | 0.00000E+00 | C40 | 0.00000E+00 | C62 | 3.48305E-07 |
| C19 | 0.00000E+00 | C41 | 1.43461E-06 | C63 | 0.00000E+00 |
| C20 | 0.00000E+00 | C42 | 0.00000E+00 | C64 | -5.08954E-07 |
| C21 | 0.00000E+00 | C43 | 9.77617E-06 | C65 | 0.00000E+00 |
| C22 | 1.74172E-05 | C44 | 0.00000E+00 | C66 | -6.32950E-08 |

FIG. 41

| s21 | (NUMERICAL EXAMPLE 3) | | | | |
|---|---|---|---|---|---|
| C1 | 0.00000E+00 | C23 | 0.00000E+00 | C45 | -5.03724E-06 |
| C2 | 0.00000E+00 | C24 | -5.71637E-04 | C46 | 0.00000E+00 |
| C3 | 0.00000E+00 | C25 | 0.00000E+00 | C47 | 0.00000E+00 |
| C4 | -1.97742E-03 | C26 | -2.01658E-04 | C48 | 0.00000E+00 |
| C5 | 0.00000E+00 | C27 | 0.00000E+00 | C49 | 0.00000E+00 |
| C6 | -3.41426E-02 | C28 | -1.80929E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.31363E-03 | C33 | 0.00000E+00 | C55 | 0.00000E+00 |
| C12 | 0.00000E+00 | C34 | 0.00000E+00 | C56 | -5.06772E-07 |
| C13 | -2.41905E-03 | C35 | 0.00000E+00 | C57 | 0.00000E+00 |
| C14 | 0.00000E+00 | C36 | 0.00000E+00 | C58 | -2.45998E-06 |
| C15 | -2.16794E-03 | C37 | 3.82438E-06 | C59 | 0.00000E+00 |
| C16 | 0.00000E+00 | C38 | 0.00000E+00 | C60 | -3.20636E-06 |
| C17 | 0.00000E+00 | C39 | 1.57057E-05 | C61 | 0.00000E+00 |
| C18 | 0.00000E+00 | C40 | 0.00000E+00 | C62 | -3.40536E-06 |
| C19 | 0.00000E+00 | C41 | -8.95599E-06 | C63 | 0.00000E+00 |
| C20 | 0.00000E+00 | C42 | 0.00000E+00 | C64 | -9.90980E-07 |
| C21 | 0.00000E+00 | C43 | -4.61518E-06 | C65 | 0.00000E+00 |
| C22 | -1.31439E-04 | C44 | 0.00000E+00 | C66 | 2.77143E-07 |

FIG. 42

| s22 | (NUMERICAL EXAMPLE 3) | | | | |
|---|---|---|---|---|---|
| C1 | 0.00000E+00 | C23 | 0.00000E+00 | C45 | 1.39312E-05 |
| C2 | 0.00000E+00 | C24 | -1.19312E-03 | C46 | 0.00000E+00 |
| C3 | 0.00000E+00 | C25 | 0.00000E+00 | C47 | 0.00000E+00 |
| C4 | 1.91335E-01 | C26 | -7.37960E-06 | C48 | 0.00000E+00 |
| C5 | 0.00000E+00 | C27 | 0.00000E+00 | C49 | 0.00000E+00 |
| C6 | 1.24383E-01 | C28 | -4.57205E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.43981E-03 | C33 | 0.00000E+00 | C55 | 0.00000E+00 |
| C12 | 0.00000E+00 | C34 | 0.00000E+00 | C56 | 9.81146E-07 |
| C13 | 9.04327E-03 | C35 | 0.00000E+00 | C57 | 0.00000E+00 |
| C14 | 0.00000E+00 | C36 | 0.00000E+00 | C58 | 3.56613E-06 |
| C15 | 2.62001E-03 | C37 | -1.82964E-05 | C59 | 0.00000E+00 |
| C16 | 0.00000E+00 | C38 | 0.00000E+00 | C60 | 5.34379E-06 |
| C17 | 0.00000E+00 | C39 | -1.58489E-05 | C61 | 0.00000E+00 |
| C18 | 0.00000E+00 | C40 | 0.00000E+00 | C62 | 2.77538E-06 |
| C19 | 0.00000E+00 | C41 | -2.92273E-05 | C63 | 0.00000E+00 |
| C20 | 0.00000E+00 | C42 | 0.00000E+00 | C64 | -5.99900E-07 |
| C21 | 0.00000E+00 | C43 | 3.19194E-06 | C65 | 0.00000E+00 |
| C22 | -1.20400E-04 | C44 | 0.00000E+00 | C66 | 1.16220E-06 |

IMAGING OPTICAL SYSTEM, IMAGING DEVICE, AND IMAGING SYSTEM

BACKGROUND

1. Technical Field

The present disclosure relates to an imaging optical system, an imaging device, and an imaging system.

2. Related Art

WO 2003/010599 A discloses a method for capturing a panoramic image with a rectangular image sensor. In WO 2003/010599 A, a circular image is converted into a rectangular image by using a toric lens as a fisheye objective lens. Accordingly, in the rectangular image sensor, a rectangular image can be formed on a rectangular imaging element to capture a panoramic image.

SUMMARY

The present disclosure provides an imaging optical system, an imaging device, and an imaging system capable of reducing an angle of view to be captured in a specific direction.

An imaging optical system according to the present disclosure is an optical system having an image circle formed on an imaging element. The imaging optical system includes lens elements arranged from an object side to an image plane side, and a diaphragm arranged between two of the lens elements that are adjacent to each other. The lens elements include freeform lens elements, each having a freeform surface that is an asymmetrical surface with respect to a first cross section and a second cross section, the first cross section being defined by a long side direction and an optical axis direction, the second cross section being defined by a short side direction and the optical axis direction, and the long side direction crossing the short side direction; at least two of the freeform lens elements are located on an object side of the diaphragm. The imaging optical system satisfies a following conditional expression (1) based on a summation for the freeform surfaces of the freeform lens elements located on the object side of the diaphragm.

[Equation 1]

$$\frac{\sum_{k=1}^{N}(SS_k - SL_k) \times \Delta nd_k}{CTF} > 0 \qquad (1)$$

where

N is a total number of freeform surfaces of the freeform lens elements located on the object side of the diaphragm, k is a number identifying a freeform surface among the total N freeform surfaces, $SL_k$ is a sag amount at a position where a height of a k-th freeform surface in the long side direction is 50% of the shortest image height among the image circle, $SS_k$ is a sag amount at a position where a height of the k-th freeform surface in the short side direction is 50% of the shortest image height among the image circle, $\Delta nd_k$ is a difference resulting from subtracting a refractive index on the object side of the k-th freeform surface from a refractive index on the image plane side of the k-th freeform surface, and CTF is a thickness of a freeform lens element located closest to the object side.

An imaging device according to the present disclosure includes the imaging optical system described above and an imaging element. The imaging element captures an image formed by the imaging optical system. The imaging element has a long side which corresponds to the long side direction, and a short side which corresponds to the short side direction and is shorter than the long side.

An imaging system according to the present disclosure includes the imaging device described above and an image processor. The image processor performs image processing on the image captured by the imaging element of the imaging device.

According to the imaging optical system, the imaging device, and the imaging system of the present disclosure, an angle of view to be captured can be reduced in a specific direction.

BRIEF DESCRIPTION OF THE DRAWINGS

FIG. 5 is a diagram showing surface data of the imaging optical system according to the numerical example 1.

FIG. 6 is a diagram showing various kinds of data of the imaging optical system according to the numerical example 1.

FIG. 7 is a diagram showing aspherical surface data of a second surface in the imaging optical system according to the numerical example 1.

FIG. 8 is a diagram showing freeform surface data of a third surface in the imaging optical system according to the numerical example 1.

FIG. 9 is a diagram showing freeform surface data of a fourth surface in the imaging optical system according to the numerical example 1.

FIG. 10 is a diagram showing freeform surface data of a fifth surface in the imaging optical system according to the numerical example 1.

FIG. 11 is a diagram showing freeform surface data of a sixth surface in the imaging optical system according to the numerical example 1.

FIG. 12 is a diagram showing freeform surface data of a twenty-first surface in the imaging optical system according to the numerical example 1.

FIG. 13 is a diagram showing freeform surface data of a twenty-second surface in the imaging optical system according to the numerical example 1.

FIG. 15 is a chart showing the sufficiency of various conditions in the imaging optical system according to the first embodiment.

FIG. 18 is a diagram showing surface data of the imaging optical system according to a numerical example 2.

FIG. 19 is a diagram showing various kinds of data of the imaging optical system according to the numerical example 2.

FIG. 20 is a diagram showing aspherical surface data of a second surface in the imaging optical system according to the numerical example 2.

FIG. 21 is a diagram showing freeform surface data of a third surface in the imaging optical system according to the numerical example 2.

FIG. 22 is a diagram showing freeform surface data of a fourth surface in the imaging optical system according to the numerical example 2.

FIG. 23 is a diagram showing freeform surface data of a fifth surface in the imaging optical system according to the numerical example 2.

FIG. 24 is a diagram showing freeform surface data of a sixth surface in the imaging optical system according to the numerical example 2.

FIG. 25 is a diagram showing aspherical surface data of a ninth surface in the imaging optical system according to the numerical example 2.

FIG. 26 is a diagram showing aspherical surface data of a tenth surface in the imaging optical system according to the numerical example 2.

FIG. 27 is a diagram showing freeform surface data of a nineteenth surface in the imaging optical system according to the numerical example 2.

FIG. 28 is a diagram showing freeform surface data of a twentieth surface in the imaging optical system according to the numerical example 2.

FIG. 32 is a diagram showing surface data of the imaging optical system according to a numerical example 3.

FIG. 33 is a diagram showing various kinds of data of the imaging optical system according to the numerical example 3.

FIG. 34 is a diagram showing aspherical surface data of a second surface in the imaging optical system according to the numerical example 3.

FIG. 35 is a diagram showing freeform surface data of a third surface in the imaging optical system according to the numerical example 3.

FIG. 36 is a diagram showing freeform surface data of a fourth surface in the imaging optical system according to the numerical example 3.

FIG. 37 is a diagram showing freeform surface data of a fifth surface in the imaging optical system according to the numerical example 3.

FIG. 38 is a diagram showing freeform surface data of a sixth surface in the imaging optical system according to the numerical example 3.

FIG. 39 is a diagram showing freeform surface data of a seventh surface in the imaging optical system according to the numerical example 3.

FIG. 40 is a diagram showing freeform surface data of an eighth surface in the imaging optical system according to the numerical example 3.

FIG. 41 is a diagram showing freeform surface data of a twenty-first surface in the imaging optical system according to the numerical example 3.

FIG. 42 is a diagram showing freeform surface data of a twenty-second surface in the imaging optical system according to the numerical example 3.

DESCRIPTION OF EMBODIMENTS

Hereinafter, the embodiments will be described in detail with reference to the drawings as appropriate. However, more detailed description than necessary may be omitted. For example, detailed descriptions of already well-known matters or duplicate descriptions of substantially the same configurations may be omitted. This is to avoid unnecessary redundancy in the following description and to facilitate understanding by those skilled in the art.

It should be noted that In addition, the applicant provides the accompanying drawings and the following description so that those skilled in the art can sufficiently understand the present disclosure, and they are not intended to limit the subject matter set forth in the claims.

First Embodiment

A first embodiment of an imaging optical system, an imaging device, and an imaging system according to the present disclosure will now be described with reference to the drawings.

2. Imaging system

Figure 1:
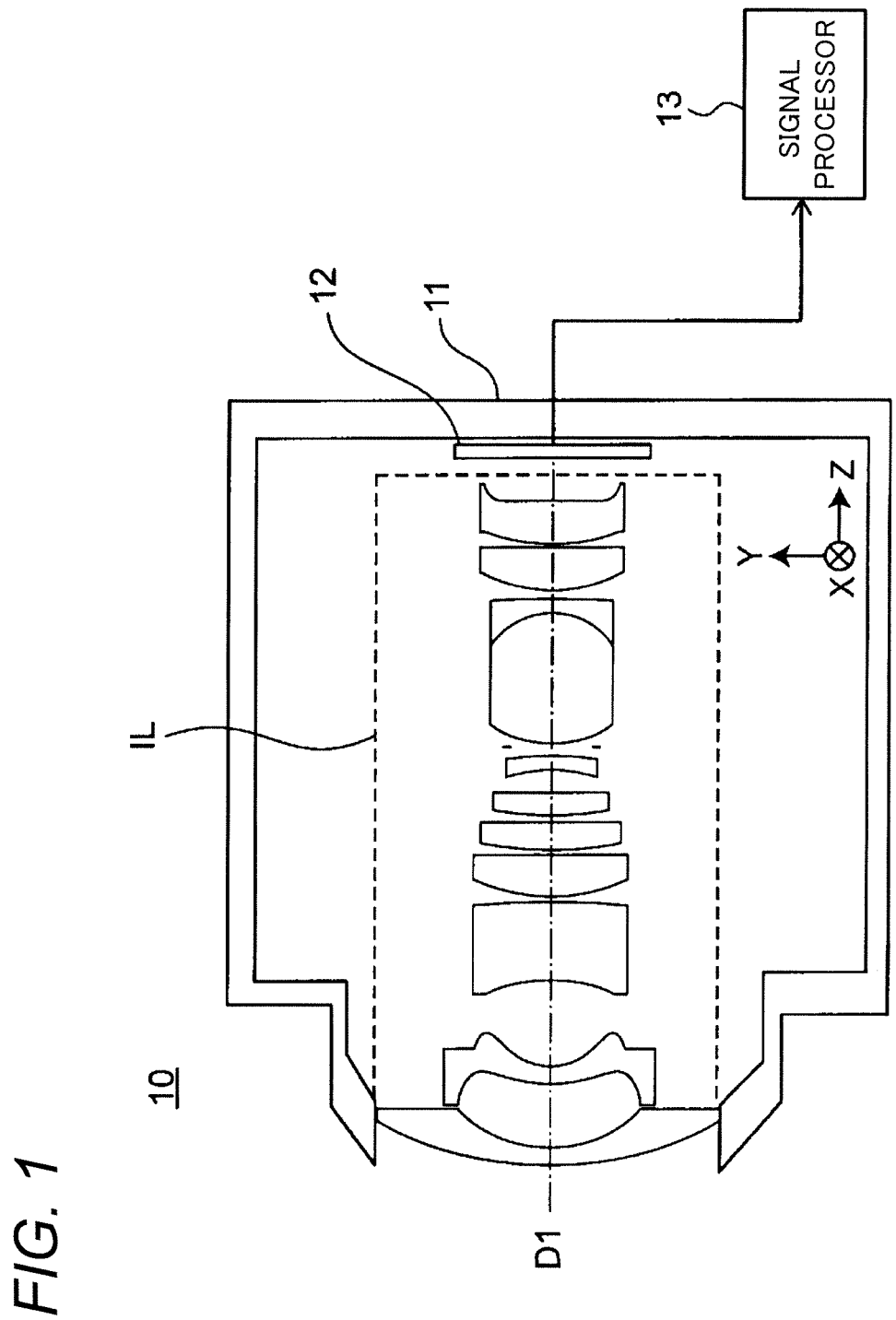
FIG. 1 is a diagram showing a configuration of an imaging system according to a first embodiment of the present disclosure.

The imaging system according to the present embodiment will be described with reference to FIG. 1. FIG. 1 is a diagram showing a configuration of an imaging system 10 according to the present embodiment.

As shown in FIG. 1, the imaging system 10 according to the present embodiment includes an imaging device 11 and an image processor 13, for example. The imaging device 11 includes an imaging optical system IL and an imaging element 12. The imaging device 11 is a device that captures images of various objects as subjects, such as various kinds of cameras. The image processor 13 may be incorporated in a camera or the like. Hereinafter, the direction of an optical axis D1 of the imaging optical system IL in the imaging device 11 is defined as a Z direction, the horizontal direction orthogonal to the Z direction is defined as an X direction, and the vertical direction orthogonal to the Z and X directions is defined as a Y direction.

The imaging optical system IL captures light that enters from the outside of the imaging device 11 and forms an image such as an image circle with the captured light. The imaging optical system IL is composed of a refractive optical system, for example. The imaging optical system IL will be described in detail later. Hereinafter, as shown in FIG. 1, the +Z side in the imaging optical system IL is defined as an image plane side, and the −Z side is defined as an object side.

The imaging element 12 is a CCD or CMOS image sensor, for example. The imaging element 12 has an imaging surface in which multiple pixels are two-dimensionally arranged at equal intervals. The imaging element 12 is disposed in the imaging device 11 such that the imaging surface is located on the image plane of the imaging optical system IL. The imaging element 12 captures an image formed on the imaging surface via the imaging optical system IL to generate an image signal indicating the captured image.

The image processor 13 performs predetermined image processing on the image captured by the imaging device 11 on the basis of the image signal from the imaging element 12. The image processing is gamma correction and distortion correction, for example. The image processor 13 includes, for example, a CPU or MPU that implements various functions by executing a program stored in an internal memory. The image processor 13 may include a dedicated hardware circuit designed to achieve a desired function. The image processor 13 may include a CPU, MPU, GPU, DSP, FPGA, ASIC, or the like.

In the imaging system 10 according to the present embodiment, the imaging surface of the imaging element 12 is formed in a rectangular shape, for example. The imaging surface of the imaging element 12 will be described with reference to FIG. 2.

Figure 2:
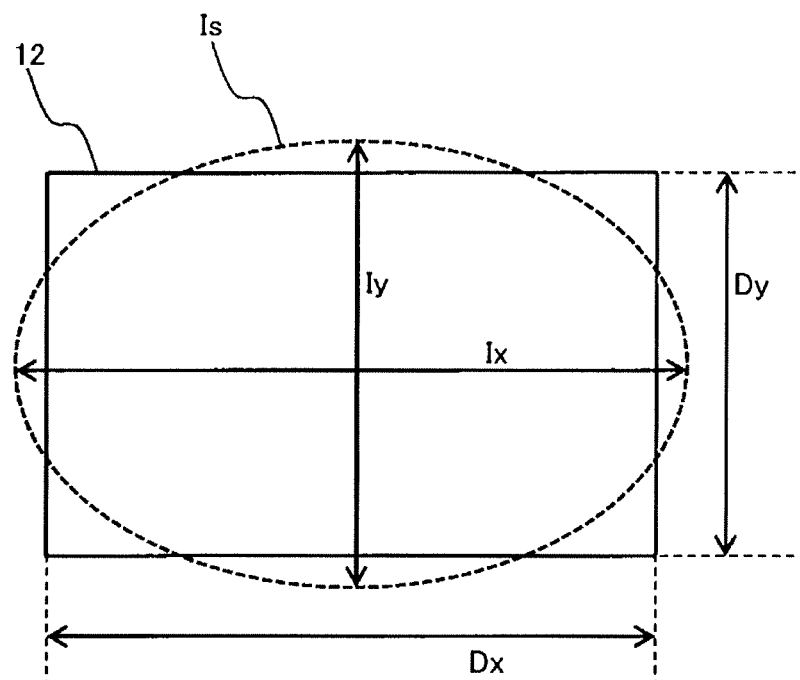
FIG. 2 is a diagram for describing an imaging element in the imaging system.

FIG. 2 shows a case where the imaging surface of the imaging element 12 is rectangular. The imaging element 12 has a long side Dx and a short side Dy that define the imaging surface. In the example of FIG. 2, the long side Dx is orthogonal to the short side Dy and is longer than the short side Dy. The imaging element 12 is disposed such that the long side Dx is parallel to the X direction and the short side Dy is parallel to the Y direction. Hereinafter, the X direction may be referred to as a long side direction, and the Y direction may be referred to as a short side direction.

FIG. 2 illustrates the positional relationship between an image circle Is formed by the imaging optical system IL and the imaging surface. The image circle Is in the present embodiment has a shape distorted from a circular shape to an ellipse or the like, and has a major axis Ix and a minor axis Iy. In the example of FIG. 2, the major axis Ix is orthogonal to the minor axis Iy and is longer than the minor axis Iy. The imaging optical system IL is disposed so that the major axis Ix of the image circle Is parallel to the X direction and the minor axis Iy is parallel to the Y direction so as to correspond to the long side Dx and the short side Dy of the imaging element 12. In the present embodiment, the X direction is an example of a first direction, and the Y direction is an example of a second direction. Further, the long side Dx is an example of a first side, and the short side Dy is an example of a second side.

The image circle Is of the imaging optical system IL has a portion that is not included in the range of the imaging surface of the imaging element 12, for example. In the example of FIG. 2, the major axis Ix of the image circle Is longer than the long side Dx of the imaging element 12. The minor axis Iy of the image circle Is longer than the short side Dy of the imaging element 12. The imaging element 12 captures an image by the image circle Is within the range of the imaging surface.

In the imaging system 10 as described above, the imaging optical system IL according to the present embodiment reduces an angle of view in the short side direction (i.e., the Y direction), thereby achieving high resolution of the captured image in the short side direction. The imaging optical system IL according to the present embodiment will be described below in detail.

2. Imaging Optical System

First to third examples of the imaging optical system IL will be described below each as an example in which the imaging optical system IL according to the present embodiment is concretely embodied.

2-1. First Example

An imaging optical system IL1 according to the first example will be described with reference to FIGS. 3 to 14.

Figure 3:
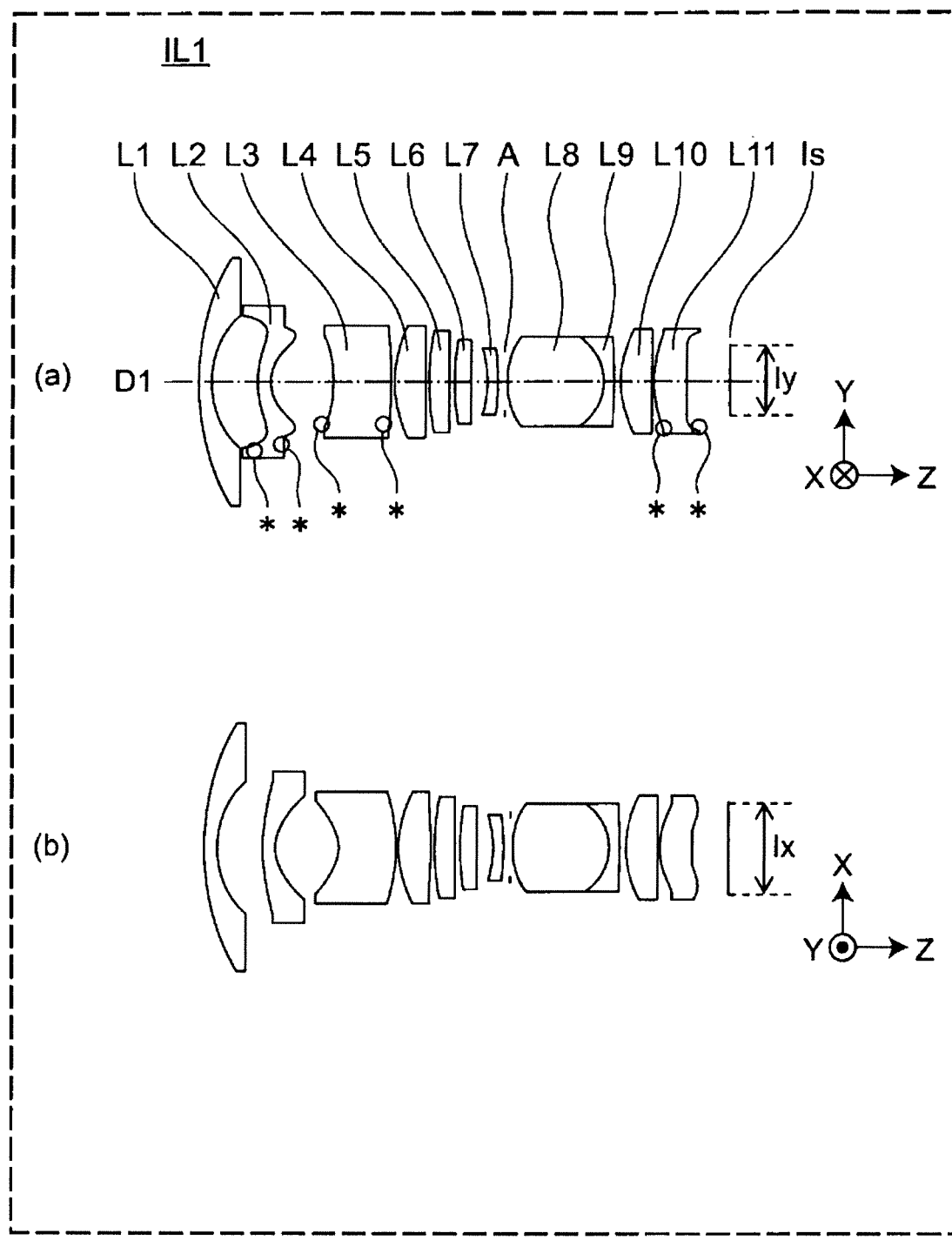
FIG. 3 is a lens layout diagram showing a configuration of an imaging optical system according to a first example.

FIG. 3 is a lens layout diagram showing a configuration of the imaging optical system IL1 according to the first example. The following lens layout diagrams show the arrangement of various lenses of the imaging optical system IL1 when focus is at infinity, for example. FIG. 3($a$) is a lens layout diagram in a YZ cross-section of the imaging optical system IL1 according to the present example. FIG. 3($b$) is a lens layout diagram in an XZ cross-section of the imaging optical system IL1. The YZ cross-section and the XZ cross-section are virtual cross-sections along an optical axis D1 of the imaging optical system IL1.

In FIG. 3($a$), a curved surface marked with "*" indicates a freeform surface. The freeform surface is a rotationally asymmetric curved surface with respect to the optical axis D1. For example, the freeform surface marked with "*" is an XY-polynomial surface described later (see equation (E2)). It should be noted that the symbols are omitted in FIG. 3($b$).

The imaging optical system IL according to the present embodiment has multiple freeform surfaces that are asymmetric between the X direction and the Y direction, as shown in FIGS. 3($a$) and 3($b$), for example. Hereinafter, a lens element having a freeform surface on at least one of the object side and the image plane side is referred to as a freeform lens element.

The imaging optical system IL1 according to the first example includes eleven lens elements L1 to L11 and a diaphragm A. As shown in FIG. 3($a$), in the imaging optical system IL1, the first to eleventh lens elements L1 to L11 are arranged in order from the object side to the image plane side along the optical axis D1. The diaphragm A is an aperture diaphragm.

In the imaging optical system IL1 in the present example, the first lens element L1 located closest to the object side constitutes a fisheye lens and is rotationally symmetric with reference to the optical axis D1. The first lens element L1 is, for example, an aspheric lens having an aspherical surface on the image plane side. For example, the first lens element L1 has a negative meniscus shape, and is arranged with its convex surface facing the object side.

In the present example, the second lens element L2 is a freeform lens element having freeform surfaces on both the object side and the image plane side. The third lens element L3 is a freeform lens element having freeform surfaces on both sides. In the imaging optical system IL1 in the present example, according to the second and third lens elements L2 and L3, four freeform surfaces are provided on the object side of the diaphragm A and two freeform lens elements are adjacent to each other.

The fourth lens element L4 is a spherical lens having a biconvex shape, for example. The fifth lens element L5 is, for example, a spherical lens having a biconvex shape. The sixth lens element L6 is a spherical lens having a biconvex shape, for example. The seventh lens element L7 is a spherical lens having a negative meniscus shape, for example. The seventh lens element L7 is arranged with its convex surface facing the image plane side.

The diaphragm A is arranged between the seventh lens element L7 and the eighth lens element L8. That is, the diaphragm A is located distant from the lens elements L2 and L3 having freeform surfaces described above by a distance corresponding to four lenses, i.e., the fourth to seventh lens elements L4 to L7. The eighth lens element L8 is a spherical lens having a biconvex shape, for example. The eighth lens element L8 and the ninth lens element L9 are joined with each other, for example. The ninth lens element L9 is a spherical lens having a negative meniscus shape, for example. The ninth lens element L9 is arranged with its convex surface facing the image plane side.

The tenth lens element L10 is a spherical lens having a biconvex shape, for example. The eleventh lens element L11 is a freeform lens element having freeform surfaces on both sides, for example. The eleventh lens element L11 is positioned closest to the image plane side in the imaging optical system IL1 according to the present example, with three lens elements of the eighth to tenth lens elements L8 to L10 being interposed between the diaphragm A and the eleventh lens element L11.

In the imaging optical system IL1 configured as described above, the second and third lens elements L2 and L3, which are freeform lens elements, are located on the object side of the diaphragm A. According to multiple freeform surfaces of the lens elements L2 and L3, light rays incident on the imaging optical system IL1 from the outside to condense at the diaphragm A can be controlled asymmetrically, and the angle of view at which the imaging optical system IL1 captures light can be reduced in a specific direction such as the Y direction. The imaging optical system IL1 can obtain an image enlarged in the Y direction on the image plane. The effects of the imaging optical system IL1 described above will be described with reference to FIG. 4.

Figure 4:
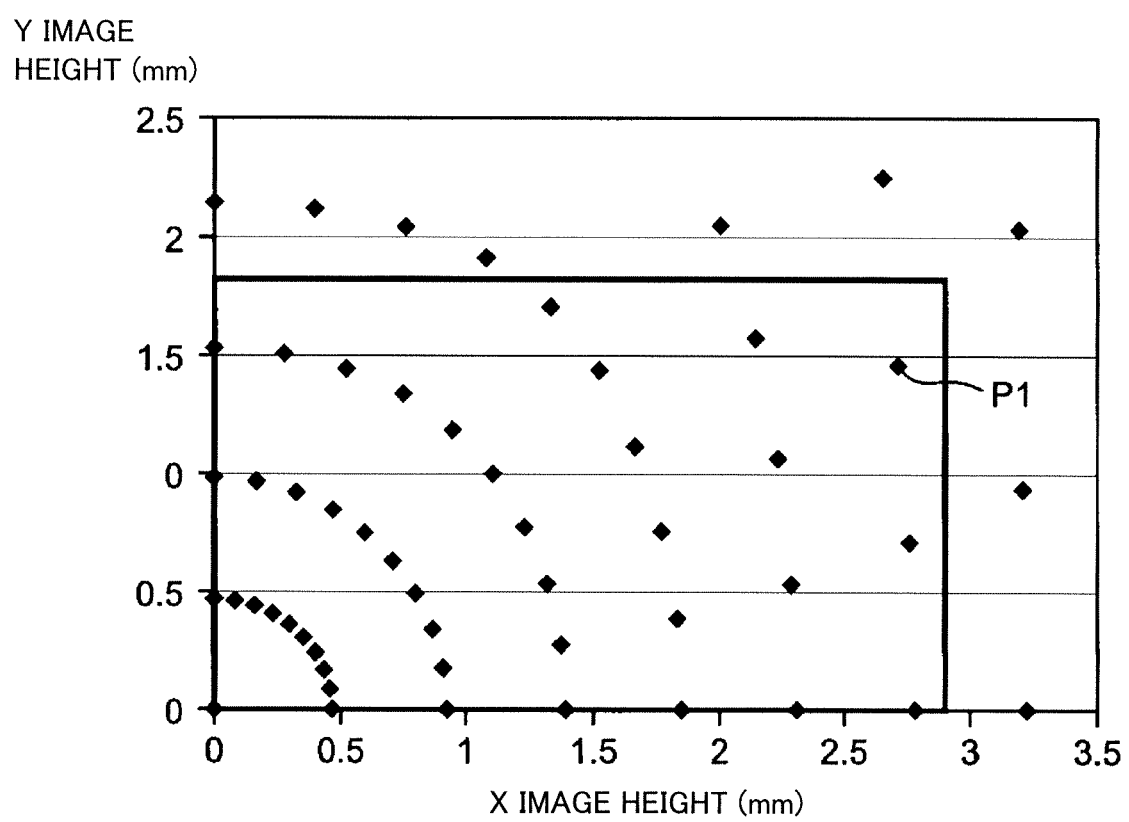
FIG. 4 is a scatter plot showing the relationship between angle of view and image point in the imaging optical system according to a numerical example 1.

FIG. 4 is a scatter plot showing the relationship between angle of view and image point P1 in the imaging optical system IL1 according to the present example. In FIG. 4, image points P1 at which incident light forms an image on the image plane are plotted for each predetermined angular width in the entire angle of view of the imaging optical system IL1. The angular width is set to 10°. Further, the imaging optical system IL1 is set such that focus is at infinity.

The plots in FIG. 4 are based on a numerical example 1 in which the imaging optical system IL1 according to the first example is numerically implemented. The numerical example 1 of the imaging optical system IL1 will be described later. FIG. 4 shows image points P1 in the first quadrant on the XY plane of the image plane with the position of the optical axis D1 as an origin. Since the imaging optical system IL1 according to the present example is line-symmetric with respect to the X axis and the Y axis, plots in the second to fourth quadrants are similar to those in FIG. 4.

According to FIG. 4, in the imaging optical system IL1 of the present example, the number of image points P1 for each of the angular widths is four along the X axis and seven along the Y axis within a thick frame. Therefore, reduction of the angle of view in the Y direction can be achieved. Further, the distance between the image points P1 along the X axis is wider than the distance between the image points P1 along the Y axis. From the above, the imaging optical system IL1 according to the present example can form an image enlarged in the Y direction.

According to the enlargement of the image as described above, on the imaging surface of the imaging element 12, more pixels are allocated along the Y direction than along the X direction. Therefore, the imaging device 11 according to the present embodiment can capture a high-resolution captured image in the Y direction.

The numerical example 1 corresponding to the imaging optical system IL1 according to the first example as described above will be described with reference to FIGS. 5 to 14.

FIG. 5 is a diagram showing surface data of the imaging optical system IL1 according to the numerical example 1. The surface data of FIG. 5 shows the surface type, and the radius of curvature r and distance d between adjacent surfaces in mm for each of surfaces s1 to s22 of the imaging optical system IL1 arranged in order from the object side, and a refractive index nd and an Abbe number vd to the d-line of each lens element. Surface types include spherical surfaces, aspherical surfaces, and XY-polynomial surfaces as freeform surfaces.

FIG. 6 is a diagram showing various kinds of data of the imaging optical system IL1 according to the numerical example 1. The various kinds of data in FIG. 6 show an F number, a vertical half angle of view, a horizontal half angle of view, a vertical image height, and a horizontal image height according to the present numerical example. The unit of image heights is "mm", and the unit of half angles of view is "°".

FIG. 7 is a diagram showing aspherical surface data of the second surface s2 in the imaging optical system IL1 according to the numerical example 1. The aspherical surface data in FIG. 7 shows various coefficients of the following equation (E1) that defines the shape of the aspherical surface for the image-plane-side surface of the first lens element L1.

[Equation 2]

$$z = \frac{h^2/r}{1 + \sqrt{1 - (1+\kappa)(h/r)^2}} + \sum A_n h^n \qquad (E1)$$

In the above equation (E1), h is a height in the radial direction, K is a conic constant, and An is an n-th order aspheric coefficient. In the second term on the right side of the above equation (E1), n is e.g. an even number of 4 or more and 20 or less, and the summation for each n is calculated. According to the above equation (E1), a sag amount z at the height h in the radial direction on the target surface is determined in a rotational symmetric manner.

FIG. 8 is a diagram showing freeform surface data of the third surface s3 in the imaging optical system IL1 according to the numerical example 1. The freeform surface data of FIG. 8 shows various coefficients of the XY polynomial defining the XY-polynomial surface as the freeform surface of the object-side surface of the second lens element L2. The XY polynomial is expressed by the following equation (E2).

[Equation 3]

$$z = \frac{cr^2}{1 + \sqrt{1 - (1+K)c^2 r^2}} + \sum_{j=2}^{66} c_j x^p y^q \qquad (E2)$$

$$j = \frac{(p+q)^2 + p + 3q}{2} + 1$$

In the above equation (E2), c is a peak curvature, K is a conic constant, and $c_j$ is a coefficient. In the second term on the right side of the above equation (E2), j is an integer of e.g. 2 or more and 66 or less, and the summation for each j is calculated. According to the above equation (E2), a sag amount z at the position of (x, y) coordinates on the target surface is determined more freely than the regularity of the anamorphic aspherical surface.

FIG. 9 is a diagram showing freeform surface data of the fourth surface s4 in the imaging optical system IL1 according to the numerical example 1. Similarly to FIG. 8, the freeform surface data in FIG. 9 indicates various coefficients of equation (E2) for the image-plane-side surface of the second lens element L2.

FIGS. 10 and 11 are diagrams respectively showing freeform surface data of the fifth surface s5 and the sixth surface s6 in the imaging optical system IL1 according to the numerical example 1. Similarly to FIG. 9, the freeform surface data in FIGS. 10 and 11 respectively show various coefficients of equation (E2) for the object-side surface and the image-plane-side surface of the third lens element L3.

FIGS. 12 and 13 are diagrams respectively showing freeform surface data of the twenty-first surface s21 and the twenty-second surface s22 in the imaging optical system IL1 according to the numerical example 1. Similarly to FIG. 9, the freeform surface data in FIGS. 12 and 13 respectively show various coefficients of equation (E2) for the object-side surface and the image-plane-side surface of the eleventh lens element L11.

Figure 14:
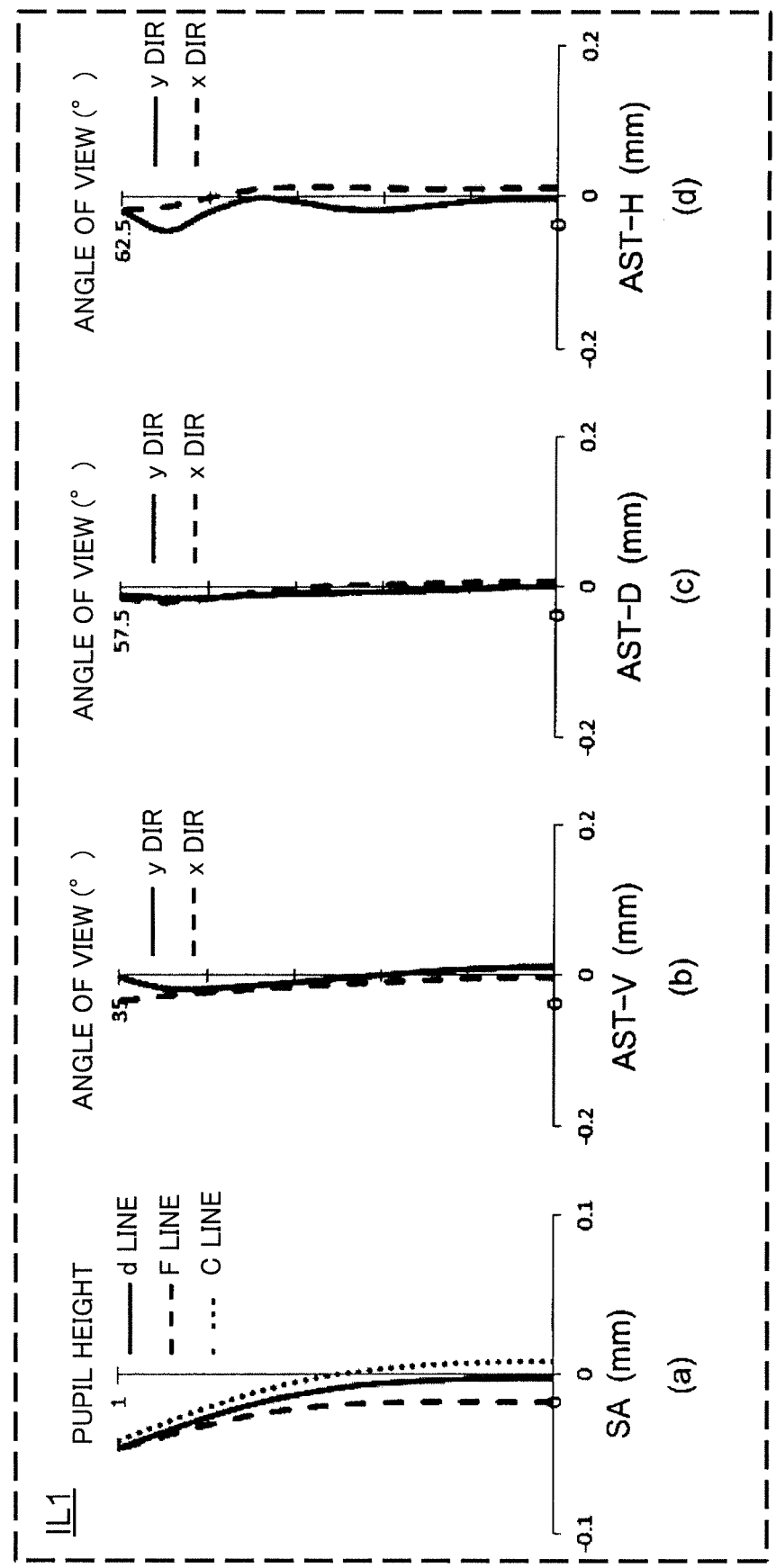
FIG. 14 is an aberration diagram showing various aberrations of the imaging optical system according to the numerical example 1.

FIG. 14 is an aberration diagram showing various aberrations of the imaging optical system IL1 according to the present example. The following aberration diagrams indicate various longitudinal aberrations when focus is at infinity. FIG. 14(a) shows a spherical aberration "SA" in the imaging optical system IL1. FIGS. 14(b), 14(c), and 14(d) show astigmatism "AST-V" in the Y direction, astigmatism "AST-H" in the X direction, and astigmatism "AST-D" in the diagonal direction, respectively.

The horizontal axis of each of FIGS. 14(a) to 14(d) is expressed in mm. The vertical axis in FIG. 14(a) is based on the pupil height. FIG. 14(a) shows characteristic curves of spherical aberration with respect to the d-line, F-line and c-line. The vertical axes in FIGS. 14(b) to 14(d) are based on a half angle of view. FIGS. 14(b) to 14(d) respectively show characteristic curves of astigmatism with respect to the XZ or YZ cross-section which is along the X direction or the Y direction and the optical axis D1.

In the present embodiment, as shown in FIGS. 8 to 13, for example, only even terms of x and y are used in each freeform surface. Thus, the diagonal aberration "AST-D" and the like are the same in all of the first to fourth quadrants.

2-2. Various Conditions

Various conditions satisfied by the imaging optical system IL according to the present embodiment will be described with reference to FIGS. 15 and 16 using the numerical example 1 of the imaging optical system IL1.

FIG. 15 is a chart showing the sufficiency of various conditions in the imaging optical system IL according to the present embodiment. The chart of FIG. 15 shows that the imaging optical system IL according to the present embodiment satisfies the following conditions (1) to (7) in each of numerical examples 1 to 3.

The condition (1) is that the freeform surfaces of all the freeform lens elements located on the object side of the diaphragm A in the imaging optical system IL satisfy the following conditional expression (1). The freeform lens elements located on the object side of the diaphragm A enables to easily set an asymmetric angle of view by controlling light beams incident on the imaging optical system IL from the outside to condense at the diaphragm A.

[Equation 4]

$$\frac{\sum_{k=1}^{N}(SS_k - SL_k) \times \Delta nd_k}{CTF} > 0 \quad (1)$$

where CTF is the thickness of the freeform lens element located closest to the −Z side in the imaging optical system IL, and is e.g. the thickness of the second lens element L2 in the imaging optical system IL1 according to the first example.

In the above equation (1), N is the total number of freeform surfaces located on the object side (i.e., −Z side) of the diaphragm A. k is a number that indicates each freeform surface located on the −Z side of the diaphragm A, and is an integer from 1 to N. Hereinafter, it is assumed that the number k is set in ascending order to the image plane side (i.e., +Z side), where the freeform surface located closest to the −Z side from among the total N freeform surfaces is represented as k=1.

The left side of the above equation (1) is the summation of difference ($PS_k - PL_k$) between $PS_k$ and $PL_k$ for each freeform surface of the freeform lens elements located on the −Z side of the diaphragm A.

$PS_k = SS_k \times \Delta nd_k$ $PL_k = SL_k \times \Delta nd_k$ where $SS_k$ is a sag amount at a height YSH, which is a reference, of a k-th freeform surface in the Y direction, and indicates a representative value of a sag amount on the k-th freeform surface on the short side. The height YSH is 50% of the shortest image height in the imaging optical system IL, and is, for example, ¼ of the minor axis Iy of the image circle Is in FIG. 2. $SL_k$ is a representative value of a sag amount on the k-th freeform surface on the long side, and is a sag amount at the height YSH in the X direction. $\Delta nd_k$ is a difference resulting from subtracting a refractive index on the −Z side of the k-th freeform surface from a refractive index on the +Z side of the k-th freeform surface.

$PS_k$ indicates the tendency of power (i.e., refractive power) in the YZ cross-section of the lens according to the sag amount $SS_k$ of the k-th freeform surface on the short side. $PL_k$ indicates the tendency of power in the XZ cross-section according to the sag amount $SL_k$ of the same freeform surface on the long side. $PS_k$ and $PL_k$ will be described with reference to FIG. 16.

Figure 16:
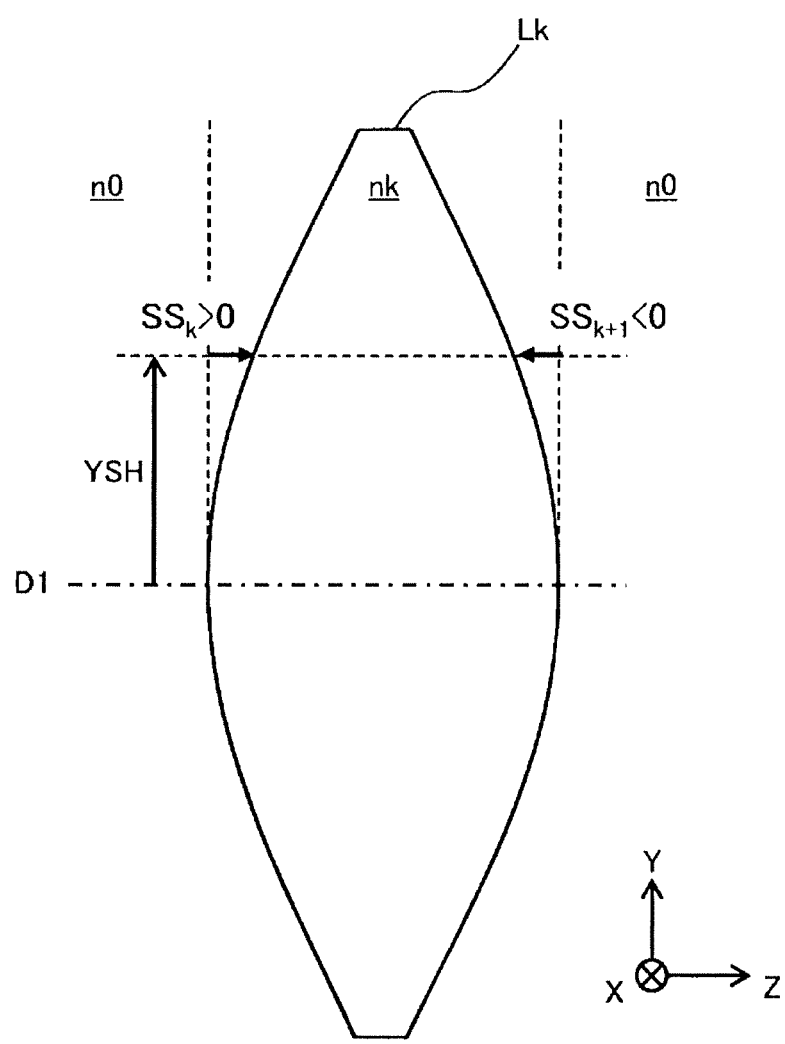
FIG. 16 is a diagram for describing various conditions in the imaging optical system.

FIG. 16 illustrates the YZ cross-section of a lens element Lk having a k-th freeform surface on the −Z side and a (k+1)th freeform surface on the +Z side. FIG. 16 illustrates a case where the lens element Lk has a biconvex shape as a whole and produces positive power on both surfaces. In this case, the sag amount $SS_k$ on the −Z side surface of the lens element Lk is positive as shown in FIG. 16. The refractive index on the +Z side of the same surface is a refractive index nk based on the material of the lens element Lk, and the refractive index on the −Z side is a refractive index n0 based on air or the like. Therefore, the difference $\Delta nd_k$ between the refractive index nk on the +Z side and the refractive index n0 on the −Z side of this surface is positive, and $PS_k = SS_k \times \Delta nd_k > 0$ is established.

Further, the sag amount SS k+1 on the +Z side surface of the lens element Lk is negative as shown in FIG. 16. Thus, the difference $\Delta nd_{k+1}$ between the refractive indexes n0 and nk on the −Z side and on the +Z side of the same surface is negative, that is, has a sign opposite to the sign of $\Delta nd_k$. Therefore, $PS_{k+1} = SS_{k+1} \times \Delta nd_{k+1} > 0$ is established.

As described above, the sign of $PS_k$ corresponds to the sign of the power in the YZ cross-section regardless of whether the corresponding freeform lens surface is on the +Z side or on the −Z side of the lens element Lk. The same applies to the sign of $PL_k$ on the XZ cross-section.

In the freeform surface, a difference between $PS_k$ and $PL_k$ occurs depending on the difference between the sag amount $SS_k$ on the short side and the sag amount $SL_k$ on the long side. When the difference ($PS_k-PL_k$) is negative, the corresponding freeform surface tends to increase the power negatively in the YZ cross-section rather than in the XZ cross-section of the lens element Lk, that is, on the short side rather than on the long side.

In view of the above, satisfying conditional expression (1) makes the freeform surfaces of the imaging optical system IL located on the −Z side of the diaphragm A to positively increase the power on the short side rather than on the long side as a whole. Therefore, the angle of view on the short side can be reduced in the imaging optical system IL according to the condition (1).

FIG. 15 shows the calculated values for the left side of conditional expression (1). In the imaging optical system IL1 shown in FIG. 3, the summation of the left side of conditional expression (1) is calculated within a range of N=4, that is within a range up to the +Z side surface of the third lens element L3, with the −Z side surface of the second lens element L2 defined as k=1. Regarding the condition (1), the calculated value "0.0085" of the imaging optical system IL1 according to the first example above the lower limit value "0" which is a value on the right side of the above conditional expression (1), as shown in FIG. 15.

If the calculated value is below the lower limit value of the condition (1), it would be difficult to reduce the angle of view on the short side, or the size of the optical system would be increased. The imaging optical system IL1 according to the first example also satisfies the condition that the lower limit value of conditional expression (1) is increased from "0" to "0.007". This condition is referred to as condition (1') below. According to the condition (1'), the angle of view on the short side can be more easily increased, and the optical system can be downsized.

The condition (2) is defined by the following conditional expression (2) based on the summation for the freeform surfaces of the freeform lens elements located on the object side of the diaphragm A, similarly to the condition (1).

$$\Sigma^N_{k=1}\{(SS_k-SL_k)\times\Delta nd_k\}/CTL1>0.0008 \quad (2)$$

where CTL1 is the thickness of the first lens element L1 that is located closest to the −Z side in the imaging optical system IL. The summation of the left side of conditional expression (2) is calculated within the same range as conditional expression (1). FIG. 15 shows the calculated values of the left side of conditional expression (2).

Below the lower limit value of conditional expression (2), it may be difficult to control astigmatism, or the size of the optical system may be increased. In contrast to this, as in the calculated values shown in FIG. 15, the imaging optical system IL1 according to the first example is above the lower limit value of conditional expression (2) and satisfies the condition (2), for example. Further, the imaging optical system IL1 according to the first example also satisfies the condition that the lower limit value of conditional expression (2) is increased to "0.008". This condition is referred to as condition (2') below. According to the condition (2'), it is possible to easily control the astigmatism of the imaging optical system IL1 and to easily downsize the optical system.

The condition (3) is defined by the following conditional expression (3) based on the summation for the freeform surfaces of the freeform lens elements located on the object side of the diaphragm A, similarly to the condition (1).

$$\Sigma^N_{k=1}\{(SS_k-SL_k)\times\Delta nd_k\}/YSH>0.0008 \quad (3)$$

The summation of the left side of conditional expression (3) is calculated within the same range as conditional expression (1). FIG. 15 shows the calculated values of the left side of conditional expression (3).

Below the lower limit value of conditional expression (3), it may be difficult to reduce the angle of view on the short side, or the optical system may be increased in size. In contrast to this, the imaging optical system IL1 according to the first example satisfies the condition (3) as shown in FIG. 15, for example. Further, the imaging optical system IL1 according to the first example also satisfies the condition that the lower limit value of conditional expression (3) is increased to "0.008". This condition is referred to as condition (3') below. According to the condition (3'), it is possible to facilitate to reduce the angle of view on the short side of the imaging optical system IL1 and to easily downsize the optical system.

The condition (4) is defined by the following conditional expression (4) based on the summation for both surfaces of the freeform lens element located closest to the −Z side in the imaging optical system IL and the summation for both surfaces of the freeform lens element located closest to the +Z side on the −Z side of the diaphragm A.

[Equation 5]

$$-6.00 < \frac{\sum_{i=1}^{2}(SS_i-SL_i)\times\Delta nd_i}{\sum_{n=1}^{2}(SS_n-SL_n)\times\Delta nd_n} < 3.00 \quad (4)$$

where the summation of the numerator on the middle side of the above equation (4) is calculated for the −Z side surface and the +Z side surface of the freeform lens element located closest to the −Z side, with each surface specified by i=1, 2. That is, $SS_i$ is a sag amount at the height YSH in the Y direction of the surface designated by i in the freeform lens element. Similarly, $SL_i$ is a sag amount at the same height YSH in the X direction of the i-th surface of the same freeform lens element. For example, in the imaging optical system IL1 according to the first example, $SL_i$ and $SS_i$ are defined on the surfaces of the second lens element L2. Note that, if the i-th surface is not a freeform surface, $SS_i=SL_i$ is established due to rotational symmetry, which does not contribute to the above summation.

The summation of the denominator on the middle side of the above equation (4) is calculated for the −Z side surface and the +Z side surface of the freeform lens element located closest to the +Z side on the −Z side of the diaphragm A, with each surface specified by n=1, 2. Similarly to the above, $SS_n$ and $SL_n$ are sag amounts at the positions having the height YSH in the X and Y directions of the surface designated by n in the freeform lens element. For example, in the first example, $SL_n$ and $SS_n$ are defined on the surfaces of the third lens element L3.

Regarding conditional expression (4), below the lower limit value, it may be difficult to control astigmatism, and above the upper limit value, it may be difficult to reduce the angle of view on the short side. In contrast to this, the imaging optical system IL1 according to the first example satisfies the condition (4) as shown in FIG. 15, for example.

Further, the imaging optical system IL1 according to the first example also satisfies the condition that the lower limit value of conditional expression (4) is increased to "−3.00" and the upper limit value is decreased to "1.00". This condition is referred to as condition (4') below. According to the condition (4'), it is possible to improve to control the astigmatism of the imaging optical system IL1 and reduce the angle of view on the short side.

The condition (5) is defined by conditional expression (5) below regarding the freeform surface located closest to the −Z side and the freeform surface located closest to the +Z side on the −Z side of the diaphragm A in the imaging optical system IL.

[Equation 6]

$$-5.00 < \frac{(SS_1 - SL_1) \times \Delta nd_1}{(SS_N - SL_N) \times \Delta nd_N} < 7.00 \quad (5)$$

where $SL_1$ and $SS_1$ are sag amounts at the height YSH in the X and Y directions of the freeform surface located closest to the −Z side. $SL_N$ and $SS_N$ are sag amounts at the height YSH in the X and Y directions of the freeform surface located closest to the +Z side on the −Z side of the diaphragm A. In the imaging optical system IL1 according to the first example, $SL_1$ and $SS_1$ are defined on the −Z side surface of the second lens element L2, and $SL_N$ and $SS_N$ are defined on the +Z side surface of the third lens element L3.

Regarding conditional expression (5), below the lower limit value, the optical system may be increased in size, and above the upper limit value, it may be difficult to reduce the angle of view on the short side. In contrast to this the imaging optical system IL1 according to the first example satisfies the condition (5) according to the calculated value shown in FIG. 15, for example. Further, the imaging optical system IL1 according to the first example also satisfies the condition that the lower limit value of conditional expression (5) is increased to "−2.00" and the upper limit value is decreased to "5.20". This condition is referred to as condition (5') below. According to the condition (5'), it is possible to facilitate to downsize the imaging optical system IL1 and to reduce the angle of view on the short side.

The condition (6) is defined by the following conditional expression (6) regarding refractive indexes of the freeform lens elements located on the −Z side of the diaphragm A of the imaging optical system IL.

$$0.85 < nd1/ndN < 1.2 \quad (6)$$

where nd1 is the refractive index to the d-line of the freeform lens element located closest to the −Z side. ndN is the refractive index to the d-line of the freeform lens element located closest to the +Z side on the −Z side of the diaphragm A. For example, in the first example, nd1 is the refractive index of the second lens element L2, and ndN is the refractive index of the third lens element L3.

Regarding conditional expression (6), below the lower limit value, it may be difficult to control astigmatism, and above the upper limit value, it may be difficult to control the lateral chromatic aberration. In contrast to this, the imaging optical system IL1 according to the first example satisfies the condition (6) according to the calculated value shown in FIG. 15, for example. Further, the imaging optical system IL1 according to the first example also satisfies the condition that the lower limit value of conditional expression (6) is increased to "0.9" and the upper limit value is decreased to "1.1". This condition is referred to as condition (6') below.

According to the condition (6'), it is possible to easily control the astigmatism and the lateral chromatic aberration of the imaging optical system IL1.

The condition (7) is defined by the following conditional expression (7) regarding the refractive index ndN of the freeform lens element located closest to the +Z side on the −Z side of the diaphragm A.

$$1.45 < ndN < 1.80 \quad (7)$$

Regarding conditional expression (7), below the lower limit value, it may be difficult to control curvature of field, and above the upper limit value, it may be difficult to control the lateral chromatic aberration. In contrast to this, the imaging optical system IL1 according to the first example satisfies the condition (7) according to the calculated value shown in FIG. 15, for example. Further, the imaging optical system IL1 according to the first example also satisfies the condition that the lower limit value of conditional expression (7) is increased to "1.50" and the upper limit value is decreased to "1.70". This condition is referred to as condition (7') below. According to the condition (7'), it is possible to improve to control the curvature of field and the lateral chromatic aberration.

The imaging optical system IL according to the present embodiment is not limited to the imaging optical system IL1 in the first example described above, and can be implemented in various forms. For example, in the imaging optical system IL1 according to the first example, there are two freeform lens elements located on the object side of the diaphragm A. However, in the imaging optical system IL according to the present embodiment, there may be three or more freeform lens elements located on the object side of the diaphragm A. Second and third examples of the imaging optical system IL will be described below.

2-3. Second Example

An imaging optical system IL2 according to the second example will be described with reference to FIGS. 17 to 30.

Figure 17:
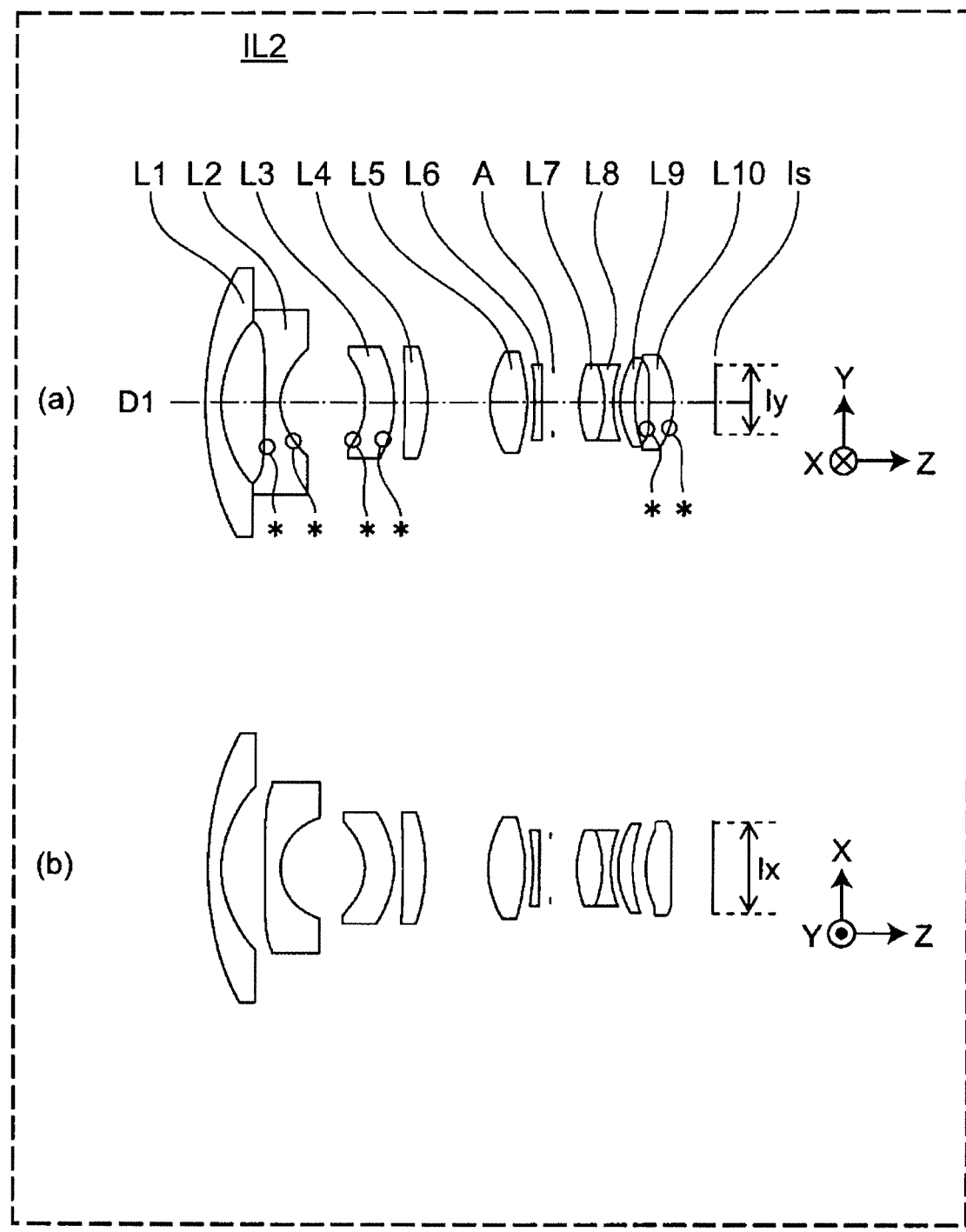
FIG. 17 is a lens layout diagram showing a configuration of an imaging optical system according to a second example.
Figure 29:
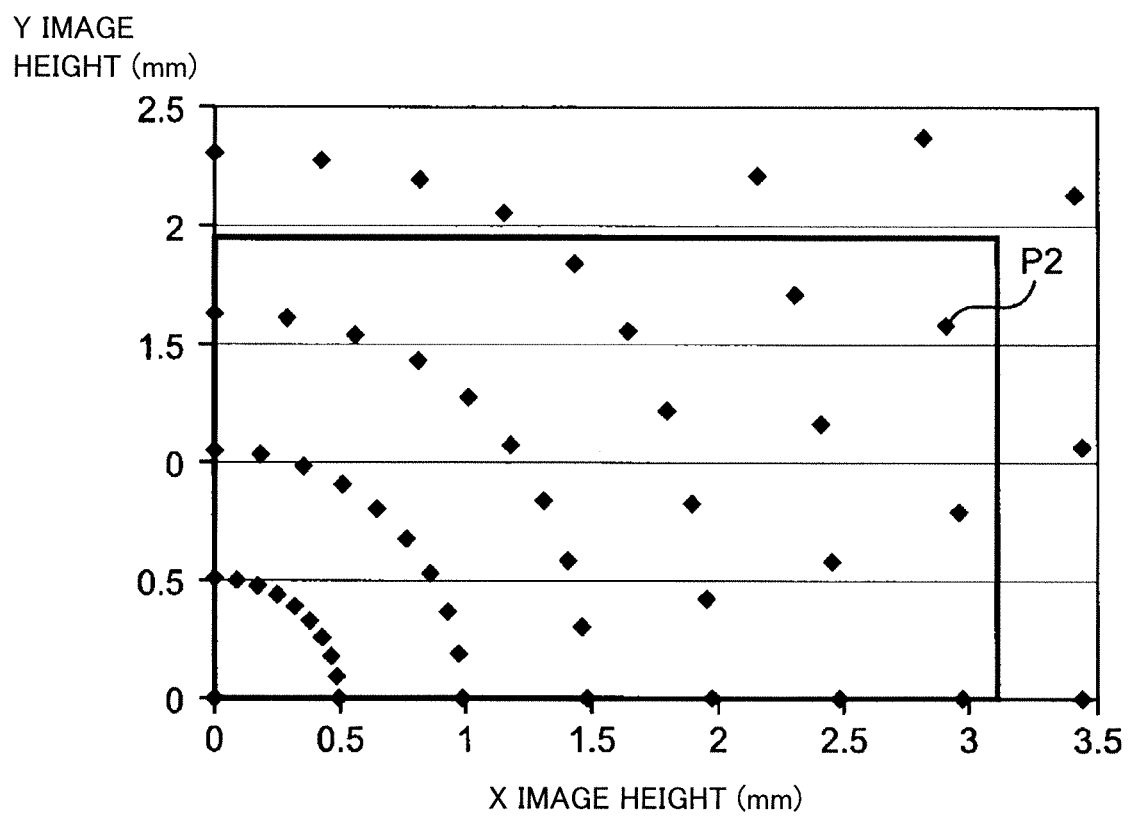
FIG. 29 is a scatter plot showing the relationship between angle of view and image point in the imaging optical system according to the numerical example 2.

FIG. 17 shows the configuration of the imaging optical system IL2 according to the second example. FIGS. 17(a) and 17(b) are diagrams showing lens arrangement of the imaging optical system IL2, similarly to FIGS. 3(a) and 3(b).

The imaging optical system IL2 according to the second example includes first to tenth lens elements L1 to L10 instead of the eleven lens elements in the configuration same as that of the first example. The diaphragm A is located between the sixth and seventh lens elements L6 and L7.

As shown in FIG. 3(a), the second and third lens elements L2 and L3 located on the object side of the diaphragm A and the tenth lens element L10 located closest to the image plane side are freeform lens elements in the imaging optical system IL2 according to the present example. In addition, in the present example, the fifth lens element L5 is an aspheric lens having aspherical surfaces on both sides. FIGS. 18 to 28 show a numerical example corresponding to the imaging optical system IL2 according to the second example.

FIG. 18 is a diagram showing surface data of the imaging optical system IL2 according to a numerical example 2. FIG. 19 is a diagram showing various kinds of data of the imaging optical system IL2 according to the present example. FIGS. 18 and 19 show respective data as in FIGS. 5 and 6 according to the numerical example 1.

FIG. 20 is a diagram showing aspherical surface data of the second surface s2 in the imaging optical system IL2 according to the present example. Similarly to the numerical example 1, the aspherical surface data in FIG. 20 indicates various coefficients of equation (E1) for the image-plane-side surface of the first lens element L1.

FIGS. 21 to 24 are diagrams respectively showing freeform surface data of the third to sixth surfaces s3 to s6 in the imaging optical system IL2 according to the present example. Similarly to the numerical example 1, the freeform surface data in FIGS. 21 to 24 shows various coefficients of equation (E2) for both surfaces of the second and third lens elements L2 and L3.

FIGS. 25 and 26 show aspherical surface data of the ninth and tenth surfaces s9 and s10 in the imaging optical system IL2 according to the present example, similarly to FIG. 20. FIGS. 27 and 28 show freeform surface data of the nineteenth and twentieth surfaces s19 and s20 in the imaging optical system IL2, similarly to FIG. 21 and the like.

Figure 30:
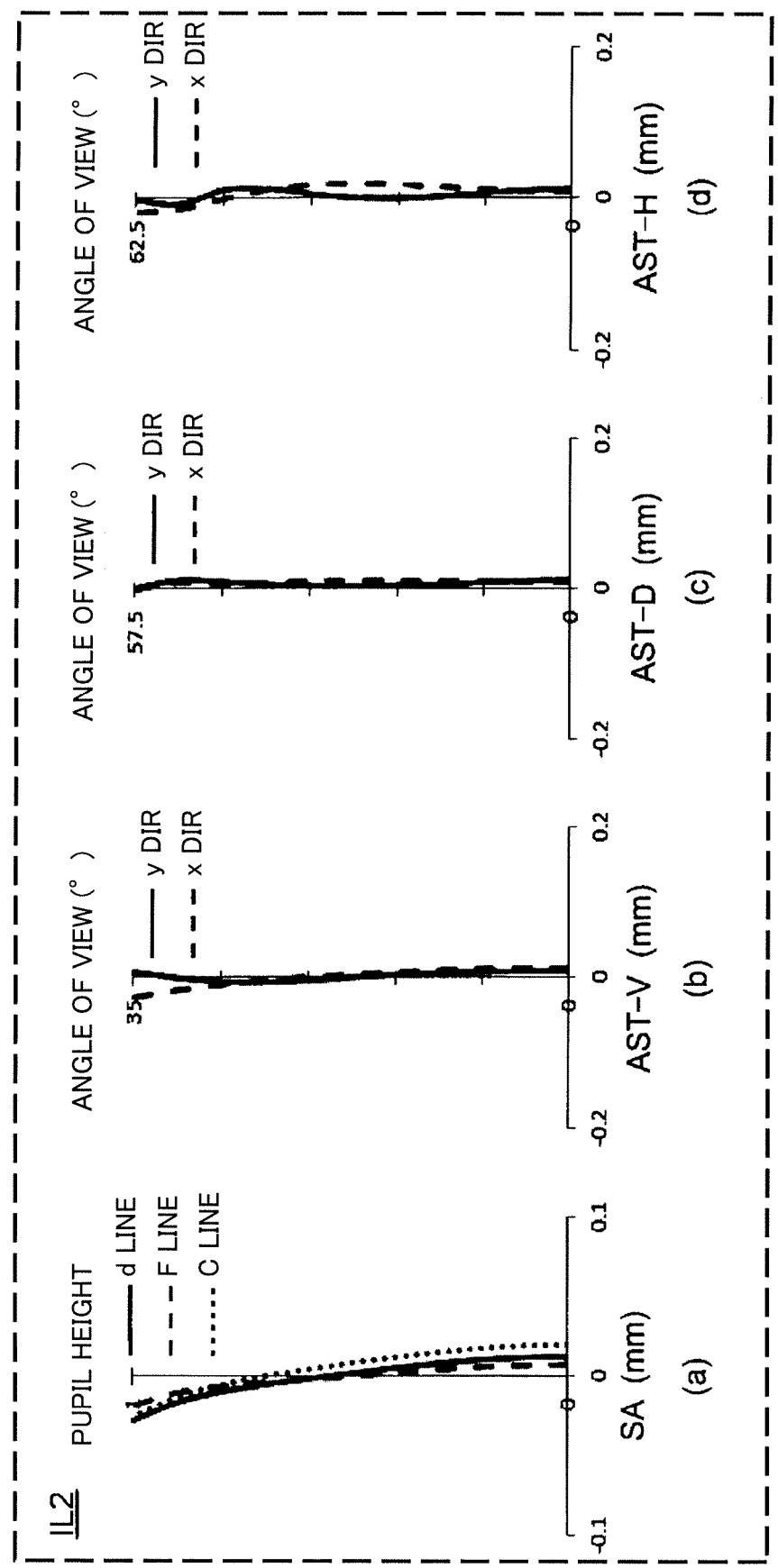
FIG. 30 is an aberration diagram showing various aberrations of the imaging optical system according to the numerical example 2.

Based on the numerical example 2 described above, FIG. 29 shows the relationship between angle of view and image point P2 in the imaging optical system IL2 according to the present example. Further, FIG. 30 shows various aberrations of the imaging optical system IL2 in the present example. Similarly to FIGS. 14(a) to 14(d), FIGS. 30(a), 30(b), 30(c), and 30(d) are aberration diagrams of the imaging optical system IL2 according to the present example. Furthermore, the imaging optical system IL2 according to the present example satisfies the abovementioned conditions (1) to (7) as shown in FIG. 15. According to the imaging optical system IL2 of the present example, the angle of view in the Y direction can also be reduced as in the first example.

2-4. Third Example

The third example describes an example of the imaging optical system IL in which there are three freeform lens elements located on the object side of the diaphragm A. An imaging optical system IL3 according to the third example will be described with reference to FIGS. 31 to 44.

Figure 31:
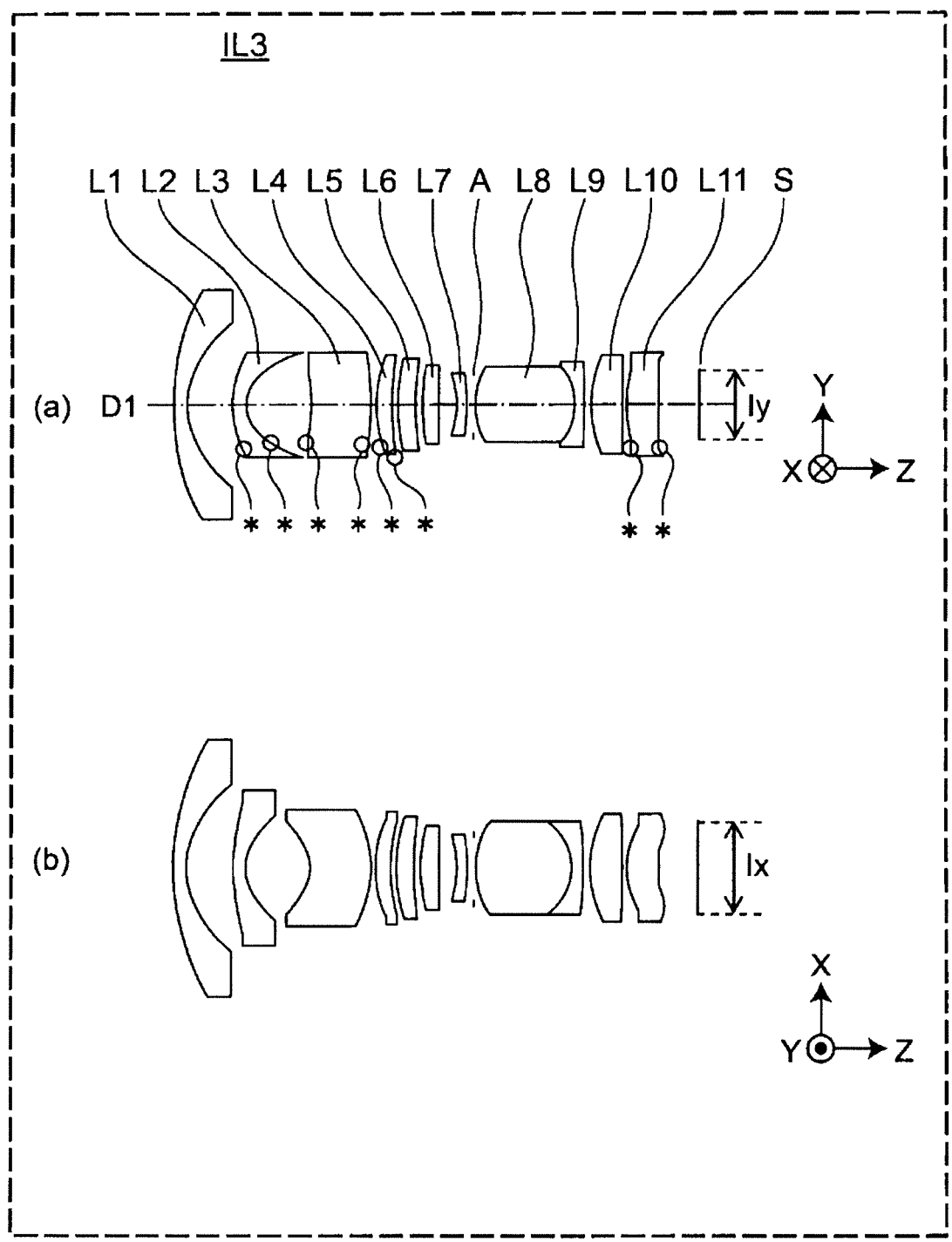
FIG. 31 is a lens layout diagram showing a configuration of an imaging optical system according to a third example.
Figure 43:
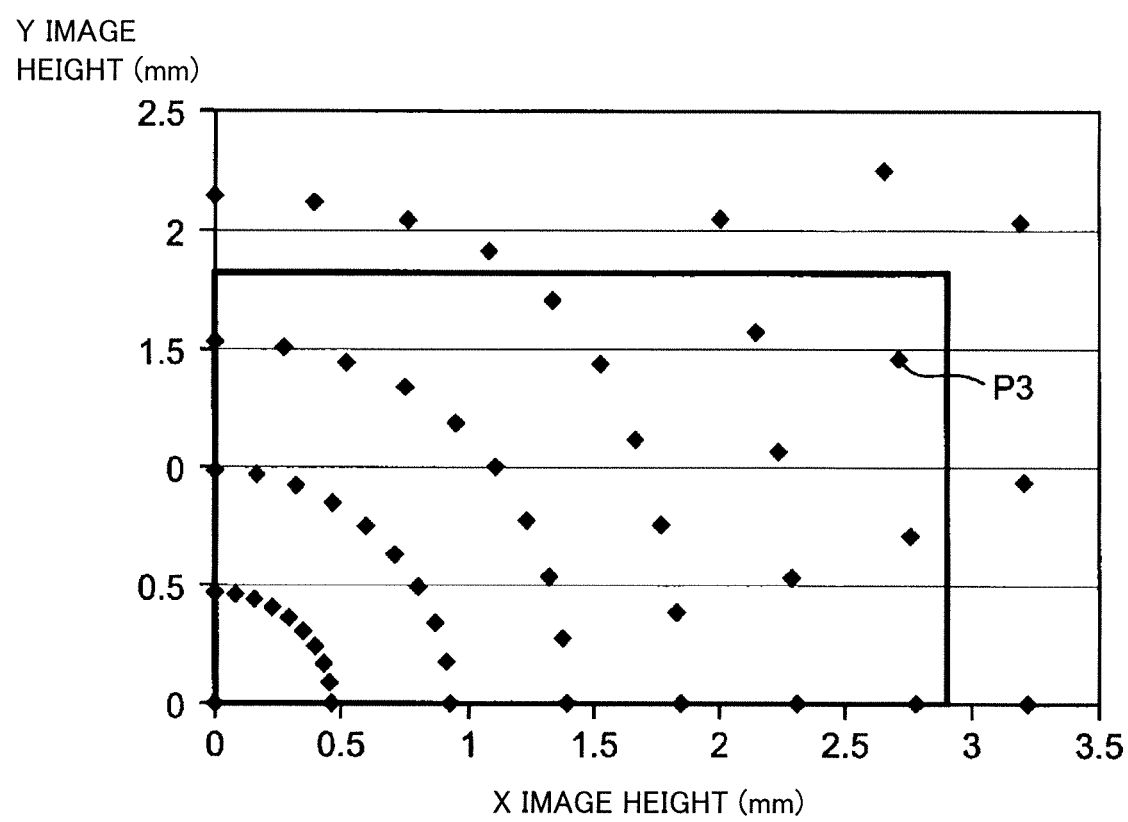
FIG. 43 is a scatter plot showing the relationship between angle of view and image point in the imaging optical system according to the numerical example 3.

FIG. 31 shows the configuration of the imaging optical system IL3 according to the third example. FIGS. 31(a) and 31(b) are diagrams showing lens arrangement of the imaging optical system IL3, similarly to FIGS. 3(a) and 3(b).

The imaging optical system IL3 according to the third example includes first to eleventh lens elements L1 to L11, which are sequentially arranged as in the first example, and a diaphragm A located between the seventh and eighth lens elements L7 and L8.

In the present example, the second and third lens elements L2 and L3 are freeform lens elements having freeform surfaces on both sides as shown in FIG. 31(a). Further, the fourth lens element L4 in the present example is a freeform lens element having freeform surfaces on both sides. In the present example, the second to fourth lens elements L2 to L4 as described above provide a total of six (N=6) freeform surfaces on the object side of the diaphragm A, and three freeform lens elements are adjacent to each other. FIGS. 32 to 42 show a numerical example corresponding to the imaging optical system IL3 according to the third example.

FIG. 32 is a diagram showing surface data of the imaging optical system IL3 according to a numerical example 3. FIG. 33 is a diagram showing various kinds of data of the imaging optical system IL3 according to the present example. FIGS. 32 and 33 show respective data as in FIGS. 5 and 6 according to the numerical example 1.

FIG. 34 is a diagram showing aspherical surface data of the second surface s2 in the imaging optical system IL3 according to the present example. Similarly to the numerical example 1, the aspherical surface data in FIG. 34 indicates various coefficients of equation (E1) for the image-plane-side surface of the first lens element L1.

FIGS. 35 to 40 are diagrams showing freeform surface data of the third to eighth surfaces s3 to s8 in the imaging optical system IL3 according to the present example. Similar to the numerical example 1, the freeform surface data in FIGS. 35 to 40 shows various coefficients of equation (E2) for both surfaces of the second to fourth lens elements L2 to L4.

FIGS. 41 and 42 are diagrams showing freeform surface data of the twenty-first and twenty-second surfaces s21 and s22 in the imaging optical system IL3. Similarly to FIGS. 35 to 40, FIGS. 41 and 42 show each freeform surface data on both surfaces of the eleventh lens element L11.

Figure 44:
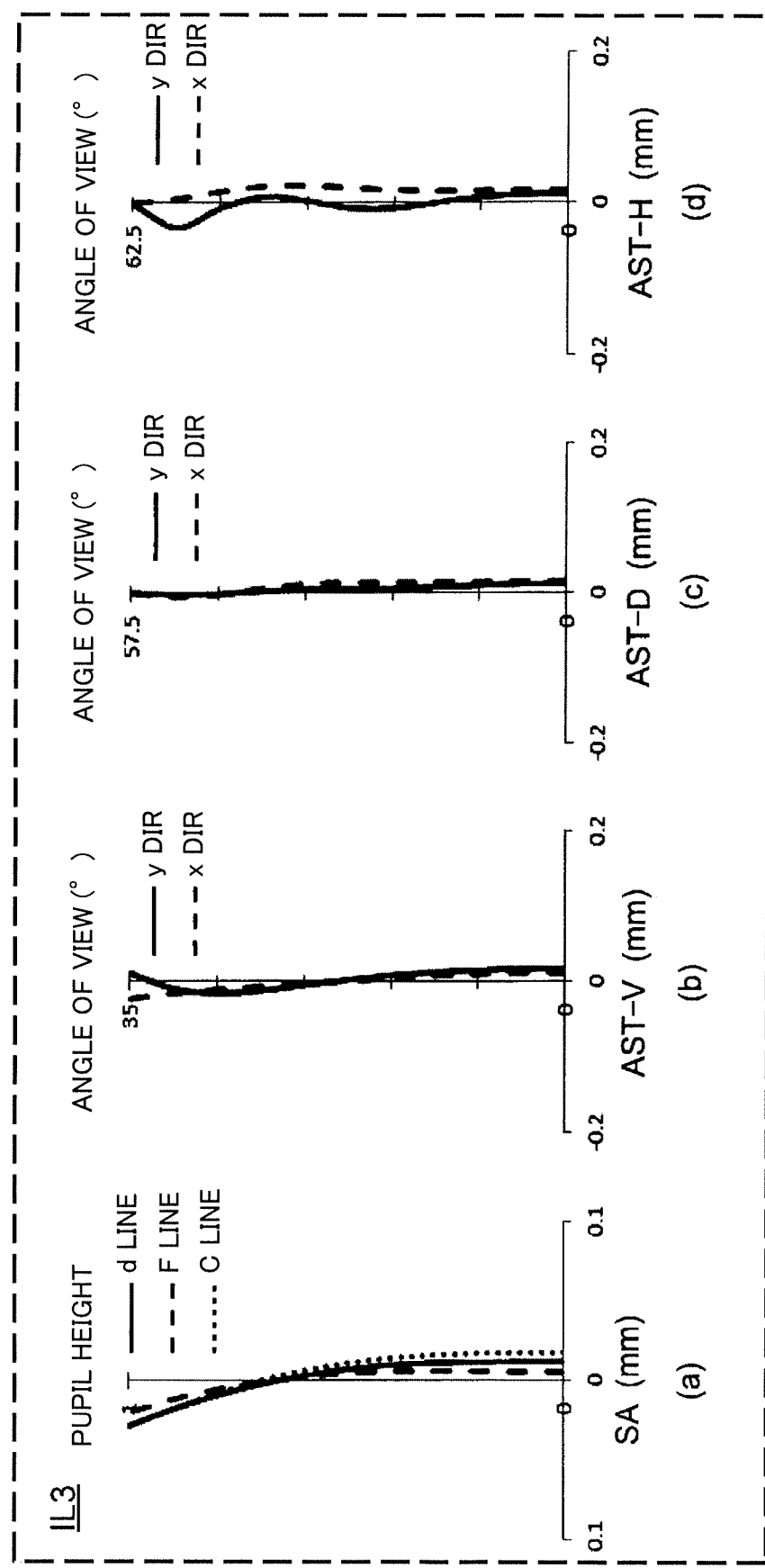
FIG. 44 is an aberration diagram showing various aberrations of the imaging optical system according to the numerical example 3.

Based on the numerical example 3 described above, FIG. 43 shows the relationship between angle of view and image point P3 in the imaging optical system IL3 according to the present example. FIG. 44 shows various aberrations of the imaging optical system IL3 in the present example. Similarly to FIGS. 14(a) to 14(d), FIGS. 44(a), 44(b), 44(c), and 44(d) are aberration diagrams of the imaging optical system IL3 according to the present example. The imaging optical system IL3 according to the present example satisfies the abovementioned conditions (1) to (7) as shown in FIG. 15. As described above, according to the imaging optical system IL3 of the present example, the angle of view in the short side direction can also be reduced as in the first example.

OTHER EMBODIMENTS

The first embodiment has been described as an example of the technique disclosed in the present application. However, the technique in the present disclosure is not limited to the above embodiment, and is also applicable to other embodiments including appropriate modifications, substitutions, additions, or omissions. In addition, a new embodiment can be made by combining constituents described in the above embodiments. Accordingly, some other embodiments will be described below.

In the first embodiment described above, a rectangular imaging surface is illustrated in FIG. 2, but the imaging surface of the imaging element 12 is not limited thereto. In the present embodiment, the imaging surface of the imaging element 12 may have various quadrilateral shapes other than the rectangular shape, or may be partially masked. Further, the imaging surface of the imaging element 12 may be curved. With respect to the imaging element 12 described above, the same effect as that of the first embodiment can be obtained by the imaging optical system IL according to the present embodiment.

For example, the long side Dx and the short side Dy of the imaging element 12 of the present embodiment do not need to be orthogonal to each other, and may cross at various angles. In the imaging optical system IL according to the present embodiment, the first and second directions defined by the major axis Ix and the minor axis Iy of the image circle Is also do not need to be orthogonal to each other and may cross at various angles. Further, the image circle Is is not necessarily distorted from a circle.

In each of the above embodiments, the XY-polynomial surface has been illustrated as an example of the freeform surface. In the present embodiment, the freeform surface is not limited to the above surface, and may be an anamorphic aspherical surface or a toric surface, for example. Further, the imaging optical system of the present embodiment may include two or more freeform surfaces that are non-anamorphic on the object side of the diaphragm A. The non-anamorphic freeform surfaces include XY-polynomial surfaces but do not include anamorphic aspherical surfaces. The non-anamorphic freeform surface may have no symmetric plane, for example.

The imaging system 10 according to the present embodiment is applicable to various uses, for example, can be mounted in vehicles. For example, the imaging device 11 may constitute an in-vehicle camera for capturing an image of a scene in front of a moving body such as a vehicle. For example, in a scene in front of the vehicle, an angle of view is reduced to exclude an area such as the sky that does not need to be imaged, so that the resolution in a desired area such as an area where the preceding vehicle is present can be increased. Further, the imaging device 11 serving as an in-vehicle camera may be configured to capture not only a scene in front of the moving body but also various scenes behind the moving body or on the side of the moving body. Further, the imaging system 10 is not limited to be mounted in vehicles for use. For example, the imaging system 10 can be applied to a surveillance camera that monitors various situations or the like.

The embodiment has been described above as an illustration of the technique of the present disclosure. The accompanying drawings and the detailed description are provided for this purpose.

Therefore, components in the accompanying drawings and the detailed description may include not only components essential for solving problems, but also components that are not essential for solving the technical problems but are merely used to illustrate the technology disclosed herein. Therefore, such inessential components should not be readily construed as being essential based on the fact that such inessential components are shown in the accompanying drawings or mentioned in the detailed description.

Furthermore, since the embodiment described above is intended to illustrate the technique in the present disclosure, various changes, substitutions, additions, omissions, and the like can be made within the scope of the claims and the scope of equivalents thereof.

(Summary of Aspects)

Various aspects according to the present disclosure will be described below.

A first aspect according to the present disclosure provides an imaging optical system having an image circle formed on an imaging element. The imaging optical system includes lens elements arranged from an object side to an image plane side, and a diaphragm arranged between two of the lens elements that are adjacent to each other. The lens elements include freeform lens elements, each having a freeform surface that is an asymmetrical surface with respect to a first cross section and a second cross section, the first cross section being defined by a long side direction and an optical axis direction, the second cross section being defined by a short side direction and the optical axis direction, and the long side direction crossing the short side direction; at least two of the freeform lens elements are located on an object side of the diaphragm. The imaging optical system satisfies a following conditional expression (1) based on a summation for the freeform surfaces of the freeform lens elements located on the object side of the diaphragm.

[Equation 7]

$$\frac{\sum_{k=1}^{N}(SS_k - SL_k) \times \Delta nd_k}{CTF} > 0 \quad (1)$$

where

N is a total number of freeform surfaces of the freeform lens elements located on the object side of the diaphragm, k is a number identifying a freeform surface among the total N freeform surfaces, $SL_k$ is a sag amount at a position where a height of a k-th freeform surface in the long side direction is 50% of the shortest image height among the image circle, $SS_k$ is a sag amount at a position where a height of the k-th freeform surface in the short side direction is 50% of the shortest image height among the image circle, $\Delta nd_k$ is a difference resulting from subtracting a refractive index on the object side of the k-th freeform surface from a refractive index on the image plane side of the k-th freeform surface, and CTF is a thickness of a freeform lens element located closest to the object side.

According to the imaging optical system described above, the freeform surfaces of the imaging optical system located on the object side of the diaphragm can positively increase power in the short side direction rather than in the long side direction as a whole, whereby an angle of view can be reduced in a specific direction such as the short side direction.

In a second aspect, the imaging optical system according to the first aspect satisfies a following conditional expression (2) based on a summation of the freeform surfaces of the freeform lens elements located on the object side of the diaphragm.

[Equation 8]

$$\frac{\sum_{k=1}^{N}(SS_k - SL_k) \times \Delta nd_k}{CTL1} > 0.0008 \quad (2)$$

where

N is a total number of freeform surfaces of the freeform lens elements located on the object side of the diaphragm, k is a number identifying a freeform surface among the total N freeform surfaces, $SL_k$ is a sag amount at a position where the height of the k-th freeform surface in the long side direction is 50% of the shortest image height among the image circle, $SS_k$ is a sag amount at a position where the height of the k-th freeform surface in the short side direction is 50% of the shortest image height among the image circle, $\Delta nd_k$ is a difference resulting from subtracting the refractive index on the object side of the k-th freeform surface from the refractive index on the image plane side of the k-th freeform surface, and CTL1 is a thickness of a lens element located closest to the object side. This configuration makes it possible to suppress astigmatism and avoid an increase in size of the optical system when reducing an angle of view in a specific direction.

In a third aspect, the imaging optical system according to the first aspect satisfies a following conditional expression (3) based on a summation for the freeform surfaces of the freeform lens elements located on the object side of the diaphragm.

[Equation 9]

$$\frac{\sum_{k=1}^{N}(SS_k - SL_k) \times \Delta nd_k}{YSH} > 0.0008 \quad (3)$$

where

N is a total number of freeform surfaces of the freeform lens elements located on the object side of the diaphragm, k is a number identifying a freeform surface among the total N freeform surfaces, $SL_k$ is a sag amount at a position where the height of the k-th freeform surface in the long side direction is 50% of the shortest image height among the image circle, $SS_k$ is a sag amount at a position where the height of the k-th freeform surface in the short side direction is 50% of the shortest image height among the image circle, $\Delta nd_k$ is a difference resulting from subtracting the refractive index on the object side of the k-th freeform surface from the refractive index on the image plane side of the k-th freeform surface, and YSH is a height 50% of the shortest image height among the image circle. This configuration can reduce an angle of view in a specific direction while avoiding an increase in size of the optical system.

In a fourth aspect, the imaging optical system according to the first aspect satisfies a following conditional expression (4) based on a summation for both surfaces of a freeform lens element located closest to the object side and a summation for both surfaces of a freeform lens element located closest to the image plane side on the object side of the diaphragm.

[Equation 10]

$$-6.00 < \frac{\sum_{i=1}^{2}(SS_i - SL_i) \times \Delta nd_i}{\sum_{n=1}^{2}(SS_n - SL_n) \times \Delta nd_n} < 3.00 \quad (4)$$

where i is a number identifying a surface of the freeform lens element located closest to the object side, $SL_i$ is a sag amount at a position where a height of an i-th surface of the freeform lens element located closest to the object side in the long side direction is 50% of the shortest image height among the image circle, $SS_i$ is a sag amount at a position where a height of the i-th surface in the short side direction is 50% of the shortest image height among the image circle, $\Delta nd_i$ is a difference resulting from subtracting a refractive index on the object side of the i-th surface from a refractive index on the image plane side of the i-th surface, n is a number identifying a surface of the freeform lens element located closest to the image plane side, $SL_n$ is a sag amount at a position where a height of an n-th surface of the freeform lens element located closest to the image plane side in the long side direction is 50% of the shortest image height among the image circle, $SS_n$ is a sag amount at a position where a height of the n-th surface in the short side direction is 50% of the shortest image height among the image circle, and $\Delta nd_n$ is a difference resulting from subtracting a refractive index on the object side of the n-th surface from a refractive index on the image plane side of the n-th surface. According to this, astigmatism can be controlled, and an angle of view can be reduced.

In a fifth aspect, the imaging optical system according to the first aspect satisfies a following conditional expression (5).

[Equation 11]

$$-5.00 < \frac{(SS_1 - SL_1) \times \Delta nd_1}{(SS_N - SL_N) \times \Delta nd_N} < 7.00 \quad (5)$$

where $SL_1$ is a sag amount at a position where a height of the freeform surface located closest to the object side in the long side direction is 50% of the shortest image height among the image circle, $SS_1$ is a sag amount at a position where a height of the freeform surface located closest to the object side in the short side direction is 50% of the shortest image height among the image circle, $\Delta nd_1$ is a difference resulting from subtracting a refractive index on the object side of the freeform surface located closest to the object side from a refractive index on the image plane side of the same freeform surface, $SL_N$ is a sag amount at a position where a height of a freeform surface located closest to the image plane side on the object side of the diaphragm in the long side direction is 50% of the shortest image height among the image circle, $SS_N$ is a sag amount at a position where a height of the freeform surface located closest to the image plane side in the short side direction is 50% of the shortest image height among the image circle, and $\Delta nd_N$ is a difference resulting from subtracting a refractive index on the object side of the freeform surface located closest to the image plane side from a refractive index on the image plane side of the same freeform surface. This configuration can reduce an angle of view while downsizing the optical system.

In a sixth aspect, the imaging optical system according to the first aspect satisfies a following conditional expression (6).

$$0.85 < nd1/ndN < 1.2 \quad (6)$$

where nd1 is a refractive index to a d-line of a freeform lens element located closest to the object side, and ndN is a refractive index to the d-line of a freeform lens element located closest to the image plane side on the object side of the diaphragm. This configuration makes it possible to reduce an angle of view while avoiding a situation in which it becomes difficult to control astigmatism and lateral chromatic aberration.

In a seventh aspect, the imaging optical system according to the first aspect satisfies a following conditional expression (7).

$$1.45 < ndN < 1.80 \quad (7)$$

where ndN is a refractive index to a d-line of a freeform lens element located closest to the image plane side on the object side of the diaphragm. This configuration makes it possible to reduce an angle of view while avoiding a situation in which it becomes difficult to control curvature of field and lateral chromatic aberration.

In an eighth aspect, in the imaging optical system according to the first aspect, the freeform lens elements located on the object side of the diaphragm are adjacent to each other. This configuration can facilitate to control the action of an asymmetric component of a light flux, and to control an asymmetric component of distortion.

In a ninth aspect, in the imaging optical system according to the first aspect, the plurality of lens elements includes a freeform lens element located on the image plane side of the diaphragm. This configuration can facilitate to control resolution, such as to increase the resolution near the center of the image plane.

In a tenth aspect, in the imaging optical system according to the first aspect, a lens element located closest to the object side is rotationally symmetrical with reference to an optical axis. Accordingly, astigmatism can be controlled.

In an eleventh aspect, in the imaging optical system according to the first aspect, a lens element located closest to the image plane side is a freeform lens element having freeform surfaces on both the object side and the image plane side. Accordingly, an asymmetric component of curvature of field can be improved.

In a twelfth aspect, in the imaging optical system according to the first aspect, the freeform lens element is arranged with three or more lens elements between the freeform lens element and the diaphragm. Accordingly, the imaging optical system can be made compact, and can improve the asymmetric component of curvature of field.

A thirteenth aspect provides an imaging device including the imaging optical system according to any one of the first to twelfth aspects and an imaging element. The imaging element captures an image formed by the imaging optical system. The imaging element has a long side which corresponds to the long side direction, and a short side which corresponds to the short side direction and is shorter than the long side. The imaging optical system can reduce an angle of view to be captured by the imaging device in a specific direction.

A fourteenth aspect provides an imaging system including the imaging device according to the thirteenth aspect and an image processor. The image processor performs image processing on the image captured by the imaging element of the imaging device. The imaging optical system can reduce an angle of view to be captured by the imaging system in a specific direction.

INDUSTRIAL APPLICABILITY

The imaging system according to the present disclosure is applicable to various uses for capturing images, such as an in-vehicle camera, a surveillance camera, a web camera, a digital camera, and the like. Further, the imaging optical system according to the present disclosure may be provided in an interchangeable lens device.

The invention claimed is:

1. An imaging optical system having an image circle defined on an imaging element, the imaging optical system comprising:
   lens elements arranged from an object side to an image plane side; and
   a diaphragm arranged between two of the lens elements that are adjacent to each other,
   wherein: the lens elements include freeform lens elements, each having a freeform surface that is an asymmetrical surface with respect to a first cross section and a second cross section, the first cross section being defined by a long side direction and an optical axis direction, the second cross section being defined by a short side direction and the optical axis direction, and the long side direction crossing the short side direction;
   at least two of the freeform lens elements are located on an object side of the diaphragm;
   the image circle has a first diameter in the long side direction and a second diameter in the short side direction, the first diameter being larger than the second diameter;
   the imaging optical system satisfies a following conditional expression (1) based on a summation for the freeform surfaces of the at least two of the freeform lens elements located on the object side of the diaphragm:

[Equation 1]

$$\frac{\sum_{k=1}^{N}(SS_k - SL_k) \times \Delta nd_k}{CTF} > 0; \tag{1}$$

N is a total number of the freeform surfaces of the at least two of the freeform lens elements located on the object side of the diaphragm k is a number identifying a k-th freeform surface of the total number of the freeform surfaces of the at least two of the freeform lens elements located on the object side of the diaphragm;

$SL_k$ is a sag amount at a first position where a first height of the k-th freeform surface in the long side direction is 50% of a shortest image height among the image circle;

$SS_k$ is a sag amount at a second position where a second height of the k-th freeform surface in the short side direction is 50% of the shortest image height among the image circle;

$\Delta nd_k$ is a difference resulting from subtracting a first refractive index on an object side of the k-th freeform surface from a second refractive index on an image plane side of the k-th freeform surface;

one of the first refractive index or the second refractive index is a lens refractive index, and the other of the first refractive index or the second refractive index is an air refractive index:

CTF is a thickness of one of the freeform lens elements which is closest to the object side, and one of the lens elements, which is closest to the image plane side, is a freeform lens element having freeform surfaces on both the object side and the image plane side.

2. The imaging optical system according to claim 1, wherein:
   the imaging optical system further satisfies a following conditional expression (2) based on the summation for the freeform surfaces of the at least two of the freeform lens elements located on the object side of the diaphragm:

[Equation 2]

$$\frac{\sum_{k=i}^{N}(SS_k - SL_k) \times \Delta nd_k}{CTL1} > 0.0008; \tag{2}$$

and

CTL1 is a thickness of one of the lens elements which is closest to the object side.

3. The imaging optical system according to claim 1, wherein:
the imaging optical system further satisfies a following conditional expression (3) based on the summation for the freeform surfaces of the at least two of the freeform lens elements located on the object side of the diaphragm:

[Equation 3]

$$\frac{\sum_{k=1}^{N}(SS_k - SL_k) \times \Delta nd_k}{YSH} > 0.0008; \qquad (3)$$

and
YSH is a height of 50% of the shortest image height among the image circle.

4. The imaging optical system according to claim 1, wherein:
the imaging optical system further satisfies a following conditional expression (4) based on a summation for both surfaces of a first of the freeform lens elements which is closest to the object side and a summation for both surfaces of a second of the freeform lens elements which is closest to the image plane side on the object side of the diaphragm:

[Equation 4]

$$-6.00 < \frac{\sum_{i=1}^{2}(SS_i - SL_i) \times \Delta nd_i}{\sum_{n=1}^{2}(SS_n - SL_n) \times \Delta nd_n} < 3.00; \qquad (4)$$

i is a number identifying an i-th surface of the surfaces of the first of the freeform lens elements;
$SL_i$ is a sag amount at a first position where a first height of the i-th surface in the long side direction is 50% of the shortest image height among the image circle;
$SS_i$ is a sag amount at a second position where a second height of the i-th surface in the short side direction is 50% of the shortest image height among the image circle;
$\Delta nd_n$ is a difference resulting from subtracting a refractive index on an object side of the i-th surface from a refractive index on an image plane side of the i-th surface;
n is a number identifying an n-th surface of the surfaces of the second of the freeform lens elements;
$SL_n$ is a sag amount at a first position where a first height of the n-th surface in the long side direction is 50% of the shortest image height among the image circle;
$SS_n$ is a sag amount at a second position where a second height of the n-th surface in the short side direction is 50% of the shortest image height among the image circle; and
$\Delta nd_n$ is a difference resulting from subtracting a refractive index on an object side of the n-th surface from a refractive index on an image plane side of the n-th surface.

5. The imaging optical system according to claim 1, wherein:
the imaging optical system further satisfies a following conditional expression (5):

[Equation 5]

$$-5.00 < \frac{(SS_1 - SL_1) \times \Delta nd_1}{(SS_N - SL_N) \times \Delta nd_N} < 7.00; \qquad (5)$$

$SL_1$ is $SL_k$ with k=1;
$SS_i$ is $SS_k$ with k=1;
$\Delta nd_i$ is $\Delta nd_k$ with k=1;
an N-th freeform surface of the total number of the freeform surfaces of the at least two of the freeform lens elements located on the object side of the diaphragm is closest to the image plane side on the object side of the diaphragm;
$SL_N$ is a sag amount at a first position where a first height of the N-th freeform surface in the long side direction is 50% of the shortest image height among the image circle;
$SS_N$ is a sag amount at a second position where a second height of the N-th freeform surface in the short side direction is 50% of the shortest image height among the image circle; and
$\Delta nd_N$ is a difference resulting from subtracting a refractive index on an object side of N-th freeform surface from a refractive index on an image plane side of the N-th freeform surface.

6. The imaging optical system according to claim 1, wherein:
the imaging optical system further satisfies a following conditional expression (6):

$$0.85 < nd1/ndN < 1.2 \qquad (6)$$

nd1 is a refractive index to a d-line of located a first of the freeform lens elements which is closest to the object side and
ndN is a refractive index to a d-line of a second of the freeform lens elements which is closest to the image plane side on the object side of the diaphragm.

7. The imaging optical system according to the claim 1, wherein:
the imaging optical system further satisfies a following conditional expression (7):

$$1.45 < ndN < 1.80 \qquad (7), \text{ and}$$

ndN is a refractive index to a d-line of one of the freeform lens elements which is closest to the image plane side on the object side of the diaphragm.

8. The imaging optical system according to claim 1, wherein the at least two of the freeform lens elements located on the object side of the diaphragm are adjacent to each other.

9. The imaging optical system according to claim 1, wherein one of the freeform lens elements is located on an image plane side of the diaphragm.

10. The imaging optical system according to claim 1, wherein one of the lens elements, which is closest to the object side, is rotationally symmetrical with reference to an optical axis.

11. An imaging device comprising:
the imaging optical system according to claim 1; and
an imaging element configured to capture an image formed by the imaging optical system,
wherein the imaging element has a long side which corresponds to the long side direction, and a short side which corresponds to the short side direction and is shorter than the long side.

12. An imaging system comprising:
the imaging device according to claim 11; and
an image processor configured to perform image processing on the image captured by the imaging element of the imaging device.

13. An imaging optical system having an image circle defined on an imaging element, the imaging optical system comprising:
lens elements arranged from an object side to an image plane side; and
a diaphragm arranged between two of the lens elements that are adjacent to each other
wherein:
the lens elements include freeform lens elements, each having a freeform surface that is an asymmetrical surface with respect to a first cross section and a second cross section, the first cross section being defined by a long side direction and an optical axis direction, the second cross section being defined by a short side direction and the optical axis direction, and the long side direction crossing the short side direction;
at least two of the freeform lens elements are located on the object side of the diaphragm;
the image circle has a first diameter in the long side direction and a second diameter in the short side direction, the first diameter being larger than the second diameter;
the imaging optical system satisfies a following conditional expression (1) based on a summation for the freeform surfaces of the at least two of the freeform lens elements located on the object side of the diaphragm:

[Equation 1]

$$\frac{\sum_{k=1}^{N}(SS_k - SL_k) \times \Delta nd_k}{CTF} > 0; \quad (1)$$

N is a total number of the freeform surfaces of the at least two of the freeform lens elements located on the object side of the diaphragm;

k is a number identifying a k-th freeform surface of the total number of the freeform surfaces of the at least two of the freeform lens elements located on the object side of the diaphragm;

$SL_k$ is a sag amount at a first position where a first height of the k-th freeform surface in the long side direction is 50% of a shortest image height among the image circle;

$SS_k$ is a sag amount at a second position where a second height of the k-th freeform surface in the short side direction is 50% of the shortest image height among the image circle;

$\Delta nd_k$ is a difference resulting from subtracting a first refractive index on an object side of the k-th freeform surface from a second refractive index on an image plane side of the k-th freeform surface;

one of the first refractive index or the second refractive index is a lens refractive index, and the other of the first refractive index or the second refractive index is an air refractive index;

CTF is a thickness of one of the freeform lens elements which is closest to the object side; and three or more of the lens elements are arranged between the one of the freeform lens elements and the diaphragm.

\* \* \* \* \*